(12) United States Patent
Yim et al.

(10) Patent No.: US 11,740,659 B2
(45) Date of Patent: Aug. 29, 2023

(54) ELECTRONIC DEVICE AND COMMUNICATION METHOD

(71) Applicant: Samsung Display Co., Ltd., Yongin-si (KR)

(72) Inventors: Dale Yim, Yongin-si (KR); Hosuk Maeng, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 182 days.

(21) Appl. No.: 17/002,241

(22) Filed: Aug. 25, 2020

(65) Prior Publication Data
US 2021/0297517 A1    Sep. 23, 2021

(30) Foreign Application Priority Data

Mar. 23, 2020   (KR) .................. 10-2020-0035095

(51) Int. Cl.
*G06F 1/16* (2006.01)
*H04M 1/02* (2006.01)
(Continued)

(52) U.S. Cl.
CPC .......... *G06F 1/1641* (2013.01); *G06F 3/0443* (2019.05); *G09G 3/035* (2020.08); *G09G 3/32* (2013.01); *G09G 5/14* (2013.01); *H01Q 1/24* (2013.01); *H01Q 9/0407* (2013.01); *H01Q 21/08* (2013.01); *H04B 7/0404* (2013.01);
(Continued)

(58) Field of Classification Search
CPC . H04M 1/0268; H04M 1/0216; G06F 3/0443; G06F 1/1641; G06F 2203/04102; G09G 3/035; G09G 3/32; G09G 5/14; G09G 2370/16; G09G 2380/02; H01Q 1/24; H01Q 9/0407; H01Q 21/08; H04B 7/0404
See application file for complete search history.

(56) References Cited

U.S. PATENT DOCUMENTS 10,615,485 B2    4/2020   Chun et al.
2017/0093467 A1* 3/2017  Molev Shteiman . H04B 7/0695
(Continued)

FOREIGN PATENT DOCUMENTS

KR    10-2014-0105886 A    9/2014
KR    10-2018-0025915 A    3/2018
(Continued)

*Primary Examiner* — Michael A Faragalla
*Assistant Examiner* — Sujit Shah
(74) *Attorney, Agent, or Firm* — Lewis Roca Rothgerber Christie LLP

(57) ABSTRACT

An electronic device includes: a display panel including a first display area at a first area, and a second display area at a second area; a plurality of first patch antennas in the first area; a plurality of second patch antennas in the second area; a display driving unit to drive the display panel; a radio frequency (RF) driving unit to drive the first and the second patch antennas; and a main processor to control the display driving unit and the RF driving unit to perform wireless data communication by using the first or the second patch antennas in a first mode in which an image is displayed through the first or second display areas, and to perform wireless data communication by using the first and the second patch antennas in a second mode in which an image is displayed through the first and second display areas.

14 Claims, 8 Drawing Sheets

(51) Int. Cl.
  *H04B 7/0404*  (2017.01)
  *H01Q 9/04*   (2006.01)
  *H01Q 21/08*  (2006.01)
  *H01Q 1/24*   (2006.01)
  *G06F 3/044*  (2006.01)
  *G09G 5/14*   (2006.01)
  *G09G 3/00*   (2006.01)
  *G09G 3/32*   (2016.01)

(52) U.S. Cl.
  CPC . *H04M 1/0216* (2013.01); *G06F 2203/04102* (2013.01); *G09G 2370/16* (2013.01); *G09G 2380/02* (2013.01); *H04M 1/0268* (2013.01)

(56) References Cited

U.S. PATENT DOCUMENTS

| | | | | |
|---|---|---|---|---|
| 2018/0316379 | A1* | 11/2018 | Chang | H01Q 1/245 |
| 2018/0342192 | A1* | 11/2018 | Lee | G09G 3/035 |
| 2019/0103656 | A1* | 4/2019 | Shi | H01Q 1/521 |
| 2019/0215103 | A1* | 7/2019 | Abdolee | H04L 1/0643 |
| 2020/0021321 | A1* | 1/2020 | Reznic | H04L 25/022 |
| 2020/0045206 | A1 | 2/2020 | Yim et al. | |
| 2020/0169303 | A1 | 5/2020 | Park et al. | |

FOREIGN PATENT DOCUMENTS

| | | |
|---|---|---|
| KR | 10-1940698 B1 | 1/2019 |
| KR | 10-2020-0015863 A | 2/2020 |

\* cited by examiner

ELECTRONIC DEVICE AND COMMUNICATION METHOD

CROSS-REFERENCE TO RELATED APPLICATION

This application claims priority to and the benefit of Korean Patent Application No. 10-2020-0035095, filed on Mar. 23, 2020, in the Korean Intellectual Property Office, the entire disclosure of which is incorporated by reference herein.

BACKGROUND

1. Field

Aspects of one or more embodiments relate to an electronic device and a communication method, and more particularly, to a communication device including a display panel, and a communication method of the communication device.

2. Description of Related Art

Display panels may be mounted on electronic devices as user interfaces. Flat-panel display devices have been widely used to reduce the weight and power consumption of electronic devices.

Recently, smart phones may be equipped with communication chips to which the fifth-generation (5G) mobile communication standard is applied. 5G wireless communication may use at least eight antennas. However, using eight antennas may be the minimum requirement, and 16, 32, or 64 antennas may be used. For example, when 16 antennas are used, 16×16 multiple-input and multiple-output (MIMO) technology is used, and a 16×16 channel matrix is used. However, power consumption may also increase as the number of antennas increases.

When a user terminal, for example, such as a smart phone, is equipped with a display panel, for example, such as an active matrix organic light-emitting diode (AMOLED) display panel, a method of embedding an antenna in a display panel in the form of a transparent thin film has been proposed.

Recently, a foldable smart phone has been provided to achieve a wide display screen and high portability. A foldable display panel may be bent horizontally or vertically along a particular region. However, current consumption may increase as the area of a display panel increases.

The above information disclosed in this Background section is for enhancement of understanding of the background of the present disclosure, and therefore, it may contain information that does not constitute prior art.

SUMMARY

One or more embodiments are directed to an electronic device capable of lowering power consumption, and a communication method of the electronic device.

Additional aspects and features will be set forth in part in the description which follows and, in part, will be apparent from the description, or may be learned by practicing one or more example embodiments of the present disclosure.

According to one or more example embodiments of the present disclosure, an electronic device, includes: a substrate including a first area and a second area; a display panel on the substrate, and including a first display area at the first area and a second display area at the second area; a plurality of first patch antennas at a first antenna area in the first area; a plurality of second patch antennas at a second antenna area in the second area; a display driving unit configured to drive the display panel; a radio frequency (RF) driving unit configured to drive the plurality of first patch antennas and the plurality of second patch antennas; and a main processor configured to control the display driving unit and the RF driving unit to perform wireless data communication by using the plurality of first patch antennas or the plurality of second patch antennas in a first mode in which an image is displayed through the first display area or the second display area, and to perform wireless data communication by using the plurality of first patch antennas and the plurality of second patch antennas in a second mode in which an image is displayed through the first display area and the second display area.

In an example embodiment, the main processor may be configured to control the display driving unit and the RF driving unit to perform the wireless data communication by using the plurality of first patch antennas when an image is displayed through the first display area, and to perform the wireless data communication by using the plurality of second patch antennas when an image is displayed through the second display area.

In an example embodiment, the first display area and the second display area may be defined by a folding line, and the display panel may be configured to be folded along the folding line.

In an example embodiment, a number of the plurality of first patch antennas may be eight, and a number of the plurality of second patch antennas may be eight.

In an example embodiment, in the first mode, eight receiving end patch antennas may be the plurality of first patch antennas or the plurality of second patch antennas, and the eight receiving end patch antennas may be configured to be driven by the RF driving unit when the RF driving unit receives wireless communication data from a transmitting end having 16 transmitting end patch antennas.

In an example embodiment, in the first mode, the eight receiving end patch antennas may be configured to receive the wireless communication data that is transmitted from the 16 transmitting end patch antennas through a communication channel defined by the following channel information matrix H:

$$H = \begin{bmatrix} h_{1,1} & h_{1,2} & h_{1,3} & h_{1,4} & h_{1,5} & h_{1,6} & h_{1,7} & h_{1,8} & h_{1,9} & h_{1,10} & h_{1,11} & h_{1,12} & h_{1,13} & h_{1,14} & h_{1,15} & h_{1,16} \\ -h_{2,2} & h_{2,1} & h_{2,4} & -h_{2,3} & h_{2,6} & -h_{2,5} & -h_{2,8} & h_{2,7} & -h_{2,10} & h_{2,9} & h_{2,12} & -h_{2,11} & h_{2,14} & -h_{2,13} & -h_{2,16} & h_{2,15} \\ -h_{3,3} & -h_{3,4} & h_{3,1} & h_{3,2} & h_{3,7} & h_{3,8} & -h_{3,5} & -h_{3,6} & -h_{3,11} & -h_{3,12} & h_{3,9} & h_{3,10} & h_{3,15} & h_{3,16} & -h_{3,13} & -h_{3,14} \\ -h_{4,4} & h_{4,3} & -h_{4,2} & h_{4,1} & h_{4,8} & -h_{4,7} & h_{4,6} & -h_{4,5} & -h_{4,12} & h_{4,11} & -h_{4,10} & h_{4,9} & h_{4,16} & -h_{4,15} & h_{4,14} & -h_{4,13} \\ -h_{5,5} & -h_{5,6} & -h_{5,7} & -h_{5,8} & h_{5,1} & h_{5,2} & h_{5,3} & h_{5,4} & -h_{5,13} & -h_{5,14} & -h_{5,15} & -h_{5,16} & h_{5,9} & h_{5,10} & h_{5,11} & h_{5,12} \\ -h_{6,6} & h_{6,5} & -h_{6,8} & h_{6,7} & -h_{6,2} & h_{6,1} & -h_{6,4} & h_{6,3} & -h_{6,14} & h_{6,13} & -h_{6,16} & h_{6,15} & -h_{6,10} & h_{6,9} & -h_{6,12} & h_{6,11} \\ -h_{7,7} & h_{7,8} & h_{7,5} & -h_{7,6} & -h_{7,3} & h_{7,4} & h_{7,1} & -h_{7,2} & -h_{7,15} & h_{7,16} & h_{7,13} & -h_{7,14} & -h_{7,11} & h_{7,12} & h_{7,9} & -h_{7,10} \\ -h_{8,8} & -h_{8,7} & h_{8,6} & h_{8,5} & -h_{8,4} & -h_{8,3} & h_{8,2} & h_{8,1} & -h_{8,16} & -h_{8,15} & h_{8,14} & h_{8,13} & -h_{8,12} & -h_{8,11} & h_{8,10} & h_{8,9} \end{bmatrix}$$

In an example embodiment, the RF driving unit may be configured to estimate transmission data $x_1$ to $x_{16}$ by decoding reception data $y_1$ to $y_8$ received by the eight receiving end patch antennas by using the following equation:

$$\begin{bmatrix} \hat{x}_1 \\ x_2 \\ x_3 \\ x_4 \\ x_5 \\ x_6 \\ x_7 \\ x_8 \\ x_9 \\ x_{10} \\ x_{11} \\ x_{12} \\ x_{13} \\ x_{14} \\ x_{15} \\ x_{16} \end{bmatrix} = (H^H H)^{-1} H^H \begin{bmatrix} y_1 \\ y_2 \\ y_3 \\ y_4 \\ y_5 \\ y_6 \\ y_7 \\ y_8 \end{bmatrix}.$$

In an example embodiment, the transmission data $x_1$ to $x_{16}$ may be sequentially transmitted through the 16 transmitting end patch antennas in a form of eight data rows arranged as:

[$x_1$; $x_2$; $x_3$; $x_4$; $x_5$; $x_6$; $x_7$; $x_8$; $x_9$; $x_{10}$; $x_{11}$; $x_{12}$; $x_{13}$; $x_{14}$; $x_{15}$; $x_{16}$],

[$-x_2$; $x_1$; $x_4$; $-x_3$; $x_6$; $-x_5$; $-x_8$; $x_7$; $-x_{10}$; $x_9$; $x_{12}$; $-x_{11}$; $x_{14}$; $-x_{13}$; $-x_{16}$; $x_{15}$],

[$-x_3$; $-x_4$; $x_1$; $x_2$; $x_7$; $x_8$; $-x_5$; $-x_6$; $-x_{11}$; $-x_{12}$; $x_9$; $x_{10}$; $x_{15}$; $x_{16}$; $-x_{13}$; $-x_{14}$],

[$-x_4$; $x_3$; $-x_2$; $x_1$; $x_8$; $-x_7$; $x_6$; $-x_5$; $-x_{12}$; $x_{11}$; $-x_{10}$; $x_9$; $x_{16}$; $-x_{15}$; $x_{14}$; $-x_{13}$],

[$-x_5$; $-x_6$; $-x_7$; $-x_8$; $x_1$; $x_2$; $x_3$; $x_4$; $-x_{13}$; $-x_{14}$; $-x_{15}$; $-x_{16}$; $x_9$; $x_{10}$; $x_{11}$; $x_{12}$],

[$-x_6$; $x_5$; $-x_8$; $x_7$; $-x_2$; $x_1$; $-x_4$; $x_3$; $-x_{14}$; $x_{13}$; $-x_{16}$; $x_{15}$; $-x_{10}$; $x_9$; $-x_{12}$; $x_{11}$],

[$-x_7$; $x_8$; $x_5$; $-x_6$; $-x_3$; $x_4$; $x_1$; $-x_2$; $-x_{15}$; $x_{16}$; $x_{13}$; $-x_{14}$; $-x_{11}$; $x_{12}$; $x_9$; $-x_{10}$], and

[$-x_8$; $-x_7$; $x_6$; $x_5$; $-x_4$; $-x_3$; $x_2$; $x_1$; $-x_{16}$; $-x_{15}$; $x_{14}$; $x_{13}$; $-x_{12}$; $-x_{11}$; $x_{10}$; $x_9$].

In an example embodiment, in the second mode, 16 receiving end patch antennas may be the plurality of first patch antennas and the plurality of second patch antennas, and the 16 receiving end patch antennas driven by the RF driving unit may be configured to receive wireless communication data from a transmitting end having eight transmitting end patch antennas.

In an example embodiment, in the second mode, the 16 receiving end patch antennas may be configured to receive the wireless communication data that is transmitted from the eight transmitting end patch antennas through a communication channel defined by the following channel information matrix H:

$$H = \begin{bmatrix} h_{1,1} & h_{1,2} & h_{1,3} & h_{1,4} & h_{1,5} & h_{1,6} & h_{1,7} & h_{1,8} \\ -h_{2,2} & h_{2,1} & h_{2,4} & -h_{2,3} & h_{2,6} & -h_{2,5} & -h_{2,8} & h_{2,7} \\ -h_{3,3} & -h_{3,4} & h_{3,1} & h_{3,2} & h_{3,7} & h_{3,8} & -h_{3,5} & -h_{3,6} \\ -h_{4,4} & h_{4,3} & -h_{4,2} & h_{4,1} & h_{4,8} & -h_{4,7} & h_{4,6} & -h_{4,5} \\ -h_{5,5} & -h_{5,6} & -h_{5,7} & -h_{5,8} & h_{5,1} & h_{5,2} & h_{5,3} & h_{5,4} \\ -h_{6,6} & h_{6,5} & -h_{6,8} & h_{6,7} & -h_{6,2} & h_{6,1} & -h_{6,4} & h_{6,3} \\ -h_{7,7} & h_{7,8} & h_{7,5} & -h_{7,6} & -h_{7,3} & h_{7,4} & h_{7,1} & -h_{7,2} \\ -h_{8,8} & -h_{8,7} & h_{8,6} & h_{8,5} & -h_{8,4} & -h_{8,3} & h_{8,2} & h_{8,1} \\ h_{1,1}^* & h_{1,2}^* & h_{1,3}^* & h_{1,4}^* & h_{1,5}^* & h_{1,6}^* & h_{1,7}^* & h_{1,8}^* \\ -h_{2,2}^* & h_{2,1}^* & h_{2,3}^* & -h_{2,3}^* & h_{2,6}^* & -h_{2,5}^* & -h_{2,8}^* & h_{2,7}^* \\ -h_{3,3}^* & -h_{3,4}^* & h_{3,1}^* & h_{3,2}^* & h_{3,7}^* & h_{3,8}^* & -h_{3,5}^* & -h_{3,6}^* \\ -h_{4,4}^* & h_{4,3}^* & -h_{4,2}^* & h_{4,1}^* & h_{4,8}^* & -h_{4,7}^* & h_{4,6}^* & -h_{4,5}^* \\ -h_{5,5}^* & -h_{5,6}^* & -h_{5,7}^* & -h_{5,8}^* & h_{5,1}^* & h_{5,2}^* & h_{5,3}^* & h_{5,4}^* \\ -h_{6,6}^* & h_{6,5}^* & -h_{6,8}^* & h_{6,7}^* & -h_{6,2}^* & h_{6,1}^* & -h_{6,4}^* & h_{6,3}^* \\ -h_{7,7}^* & h_{7,8}^* & h_{7,5}^* & -h_{7,6}^* & -h_{7,3}^* & h_{7,4}^* & h_{7,1}^* & -h_{7,2}^* \\ -h_{8,8}^* & -h_{8,7}^* & h_{8,6}^* & h_{8,5}^* & -h_{8,4}^* & -h_{8,3}^* & h_{8,2}^* & h_{8,1}^* \end{bmatrix}.$$

In an example embodiment, the RF driving unit may be configured to estimate transmission data $x_1$ to $x_8$ by decoding reception data $y_1$ to $y_8$ and $y_1^*$ to $y_8^*$ received by the 16 receiving end patch antennas by using the following equation:

$$\begin{bmatrix} \hat{x}_1 \\ x_2 \\ x_3 \\ x_4 \\ x_5 \\ x_6 \\ x_7 \\ x_8 \end{bmatrix} = (H^H H)^{-1} H^H \begin{bmatrix} y_1 \\ y_2 \\ y_3 \\ y_4 \\ y_5 \\ y_6 \\ y_7 \\ y_8 \\ y_1^* \\ y_2^* \\ y_3^* \\ y_4^* \\ y_5^* \\ y_6^* \\ y_7^* \\ y_8^* \end{bmatrix}.$$

In an example embodiment, the transmission data $x_1$ to $x_8$ may be sequentially transmitted through the eight transmitting end patch antennas in a form of 16 data rows arranged as:

[$x_1$; $x_2$; $x_3$; $x_4$; $x_5$; $x_6$; $x_7$; $x_8$],

[$-x_2$; $x_1$; $x_4$; $-x_3$; $x_6$; $-x_5$; $-x_8$; $x_7$],

[$-x_3$; $-x_4$; $x_1$; $x_2$; $x_7$; $x_8$; $-x_5$; $-x_6$],

[$-x_4$; $x_3$; $-x_2$; $x_1$; $x_8$; $-x_7$; $x_6$; $-x_5$],

[$-x_5$; $-x_6$; $-x_7$; $-x_8$; $x_1$; $x_2$; $x_3$; $x_4$],

[$-x_6$; $x_5$; $-x_8$; $x_7$; $-x_2$; $x_1$; $-x_4$; $x_3$],

[$-x_7$; $x_8$; $x_5$; $-x_6$; $-x_3$; $x_4$; $x_1$; $-x_2$],

[$-x_8$; $-x_7$; $x_6$; $x_5$; $-x_4$; $-x_3$; $x_2$; $x_1$],

[$x_1^*$; $x_2^*$; $x_3^*$; $x_4^*$; $x_5^*$; $x_6^*$; $x_7^*$; $x_8^*$],

[$-x_2^*$; $x_1^*$; $x_4$; $-x_3$; $x_6$; $-x_5$; $-x_8$; $x_7$], $[-x_3^*; -x_4^*; x_1^*; x_2^*; x_7^*; x_8^*; -x_5^*; -x_6^*]$,
$[-x_4^*; x_3^*; -x_2^*; x_1^*; x_8^*; -x_7^*; x_6^*; -x_5^*]$,
$[-x_5^*; -x_6^*; -x_7^*; -x_8^*; x_1^*; x_2^*; x_3^*; x_4^*]$,
$[-x_6^*; x_5^*; -x_8^*; x_7^*; -x_2^*; x_1^*; -x_4^*; x_3^*]$,
$[-x_7^*; x_8^*; x_5^*; -x_6^*; -x_3^*; x_4^*; x_1^*; -x_2^*]$, and
$[-x_8^*; -x_7^*; x_6^*; x_5^*; -x_4^*; -x_3^*; x_2^*; x_1^*]$.

According to one or more example embodiments of the present disclosure, a communication method between an electronic device and a transmitting device, the electronic device including: a substrate including a first area and a second area; a display panel including a first display area at the first area and a second display area at the second area; a plurality of first patch antennas at the first area; and a plurality of second patch antennas at the second area, includes: performing, by the electronic device, wireless data communication by using the plurality of first patch antennas or the plurality of second patch antennas in a first mode in which an image is displayed through the first display area or the second display area; and performing, by the electronic device, wireless data communication by using the plurality of first patch antennas and the plurality of second patch antennas in a second mode in which an image is displayed through the first display area and the second display area.

In an example embodiment, the method may further include: performing, by the electronic device, wireless data communication by using the plurality of first patch antennas in a 1-1 mode in which an image is displayed through the first display area; and performing, by the electronic device, wireless data communication by using the plurality of second patch antennas in a 1-2 mode in which an image is displayed through the second display area.

In an example embodiment, the method may further include: transmitting, by the transmitting device, wireless communication data by using 16 transmitting end patch antennas in the first mode; and receiving, by the electronic device, the wireless communication data by using eight receiving end patch antennas, which may be the plurality of first patch antennas or the plurality of second patch antennas in the first mode.

In an example embodiment, in the first mode, the wireless communication data may be transmitted from the 16 transmitting end patch antennas to the eight receiving end patch antennas through a communication channel defined by the following channel information matrix H:

In an example embodiment, the method may further include estimating, by the electronic device, transmission data $x_1$ to $x_{16}$ by decoding reception data $y_1$ to $y_8$ received by the eight receiving end patch antennas by using the following equation:

$$\begin{bmatrix} \hat{x}_1 \\ x_2 \\ x_3 \\ x_4 \\ x_5 \\ x_6 \\ x_7 \\ x_8 \\ x_9 \\ x_{10} \\ x_{11} \\ x_{12} \\ x_{13} \\ x_{14} \\ x_{15} \\ x_{16} \end{bmatrix} = (H^H H)^{-1} H^H \begin{bmatrix} y_1 \\ y_2 \\ y_3 \\ y_4 \\ y_5 \\ y_6 \\ y_7 \\ y_8 \end{bmatrix}.$$

In an example embodiment, the method may further include: transmitting, by the transmitting device, wireless communication data by using eight transmitting end patch antennas in the second mode; and receiving, by the electronic device, the wireless communication data by using 16 receiving end patch antennas, which may be the plurality of first patch antennas and the plurality of second patch antennas in the second mode.

In an example embodiment, in the second mode, the wireless communication data may be transmitted from the eight transmitting end patch antennas to the 16 receiving end patch antennas through a communication channel defined by the following channel information matrix H:

$$H = \begin{bmatrix} h_{1,1} & h_{1,2} & h_{1,3} & h_{1,4} & h_{1,5} & h_{1,6} & h_{1,7} & h_{1,8} \\ -h_{2,2} & h_{2,1} & h_{2,4} & -h_{2,3} & h_{2,6} & -h_{2,5} & -h_{2,8} & h_{2,7} \\ -h_{3,3} & -h_{3,4} & h_{3,1} & h_{3,2} & h_{3,7} & h_{3,8} & -h_{3,5} & -h_{3,6} \\ -h_{4,4} & h_{4,3} & -h_{4,2} & h_{4,1} & h_{4,8} & -h_{4,7} & h_{4,6} & -h_{4,5} \\ -h_{5,5} & -h_{5,6} & -h_{5,7} & -h_{5,8} & h_{5,1} & h_{5,2} & h_{5,3} & h_{5,4} \\ -h_{6,6} & h_{6,5} & -h_{6,8} & h_{6,7} & -h_{6,2} & h_{6,1} & -h_{6,4} & h_{6,3} \\ -h_{7,7} & h_{7,8} & h_{7,5} & -h_{7,6} & -h_{7,3} & h_{7,4} & h_{7,1} & -h_{7,2} \\ -h_{8,8} & -h_{8,7} & h_{8,6} & h_{8,5} & -h_{8,4} & -h_{8,3} & h_{8,2} & h_{8,1} \\ h_{1,1}^* & h_{1,2}^* & h_{1,3}^* & h_{1,4}^* & h_{1,5}^* & h_{1,6}^* & h_{1,7}^* & h_{1,8}^* \\ -h_{2,2}^* & h_{2,1}^* & h_{2,3}^* & -h_{2,3}^* & h_{2,6}^* & -h_{2,5}^* & -h_{2,8}^* & h_{2,7}^* \\ -h_{3,3}^* & -h_{3,4}^* & h_{3,1}^* & h_{3,2}^* & h_{3,7}^* & h_{3,8}^* & -h_{3,5}^* & -h_{3,6}^* \\ -h_{4,4}^* & h_{4,3}^* & -h_{4,2}^* & h_{4,1}^* & h_{4,8}^* & -h_{4,7}^* & h_{4,6}^* & -h_{4,5}^* \\ -h_{5,5}^* & -h_{5,6}^* & -h_{5,7}^* & -h_{5,8}^* & h_{5,1}^* & h_{5,2}^* & h_{5,3}^* & h_{5,4}^* \\ -h_{6,6}^* & h_{6,5}^* & -h_{6,8}^* & h_{6,7}^* & -h_{6,2}^* & h_{6,1}^* & -h_{6,4}^* & h_{6,3}^* \\ -h_{7,7}^* & h_{7,8}^* & h_{7,5}^* & -h_{7,6}^* & -h_{7,3}^* & h_{7,4}^* & h_{7,1}^* & -h_{7,2}^* \\ -h_{8,8}^* & -h_{8,7}^* & h_{8,6}^* & h_{8,5}^* & -h_{8,4}^* & -h_{8,3}^* & h_{8,2}^* & h_{8,1}^* \end{bmatrix}.$$

$$H = \begin{bmatrix} h_{1,1} & h_{1,2} & h_{1,3} & h_{1,4} & h_{1,5} & h_{1,6} & h_{1,7} & h_{1,8} & h_{1,9} & h_{1,10} & h_{1,11} & h_{1,12} & h_{1,13} & h_{1,14} & h_{1,15} & h_{1,16} \\ -h_{2,2} & h_{2,1} & h_{2,4} & -h_{2,3} & h_{2,6} & -h_{2,5} & -h_{2,8} & h_{2,7} & -h_{2,10} & h_{2,9} & h_{2,12} & -h_{2,11} & h_{2,14} & -h_{2,13} & -h_{2,16} & h_{2,15} \\ -h_{3,3} & -h_{3,4} & h_{3,1} & h_{3,2} & h_{3,7} & h_{3,8} & -h_{3,5} & -h_{3,6} & -h_{3,11} & -h_{3,12} & h_{3,9} & h_{3,10} & h_{3,15} & h_{3,16} & -h_{3,13} & -h_{3,14} \\ -h_{4,4} & h_{4,3} & -h_{4,2} & h_{4,1} & h_{4,8} & -h_{4,7} & h_{4,6} & -h_{4,5} & -h_{4,12} & h_{4,11} & -h_{4,10} & h_{4,9} & h_{4,16} & -h_{4,15} & h_{4,14} & -h_{4,13} \\ -h_{5,5} & -h_{5,6} & -h_{5,7} & -h_{5,8} & h_{5,1} & h_{5,2} & h_{5,3} & h_{5,4} & -h_{5,13} & -h_{5,14} & -h_{5,15} & -h_{5,16} & h_{5,9} & h_{5,10} & h_{5,11} & h_{5,12} \\ -h_{6,6} & h_{6,5} & -h_{6,8} & h_{6,7} & -h_{6,2} & h_{6,1} & -h_{6,4} & h_{6,3} & -h_{6,14} & h_{6,13} & -h_{6,16} & h_{6,15} & -h_{6,10} & h_{6,9} & -h_{6,12} & h_{6,11} \\ -h_{7,7} & h_{7,8} & h_{7,5} & -h_{7,6} & -h_{7,3} & h_{7,4} & h_{7,1} & -h_{7,2} & -h_{7,15} & h_{7,16} & h_{7,13} & -h_{7,14} & -h_{7,11} & h_{7,12} & h_{7,9} & -h_{7,10} \\ -h_{8,8} & -h_{8,7} & h_{8,6} & h_{8,5} & -h_{8,4} & -h_{8,3} & h_{8,2} & h_{8,1} & -h_{8,16} & -h_{8,15} & h_{8,14} & h_{8,13} & -h_{8,12} & -h_{8,11} & h_{8,10} & h_{8,9} \end{bmatrix}.$$

In an example embodiment, the method may further include estimating, by the electronic device, transmission data $x_1$ to $x_8$ by decoding reception data $y_1$ to $y_8$ and $y_1^*$ to $y_8^*$ received by the 16 receiving end patch antennas by using the following equation:

$$\begin{bmatrix} \hat{x}_1 \\ x_2 \\ x_3 \\ x_4 \\ x_5 \\ x_6 \\ x_7 \\ x_8 \end{bmatrix} = (H^H H)^{-1} H^H \begin{bmatrix} y_1 \\ y_2 \\ y_3 \\ y_4 \\ y_5 \\ y_6 \\ y_7 \\ y_8 \\ y_1^* \\ y_2^* \\ y_3^* \\ y_4^* \\ y_5^* \\ y_6^* \\ y_7^* \\ y_8^* \end{bmatrix}.$$

BRIEF DESCRIPTION OF THE DRAWINGS

The above and other aspects and features of the present disclosure will become more apparent to those skilled in the art from the following detailed description of the example embodiments with reference to the accompanying drawings, in which.

DETAILED DESCRIPTION

Figure 1:
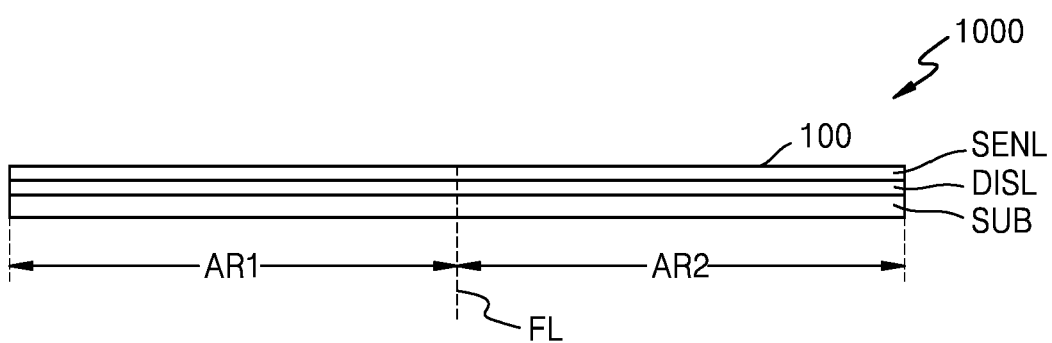
FIGS. 1-2 are schematic cross-sectional views of an electronic device according to an embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the drawings, depending on manufacturing techniques and/or tolerances, for example, various modifications to the illustrated shapes may be expected. Therefore, the present disclosure should not be construed as being limited to a particular shape of a region shown in one or more of the example embodiments, but should include a change in shape resulting from, for example, a manufacturing process.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. For example, the expression "at least one of a, b or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

As used herein, the terms "corresponding" or "correspondingly" may refer to components that are arranged or connected in the same column and/or row depending on the context. For example, when a first member is referred to as being connected to a "corresponding" second member among a plurality of second members, the first member is connected to a second member arranged in the same column and/or row as the first member. For another example, when a plurality of pixel circuits and a plurality light-emitting elements are respectively arranged in a row direction and a column direction on a substrate, when a light-emitting element is referred to as being connected to a corresponding pixel circuit, the light-emitting element is connected to a pixel circuit located in the same row and column from among the plurality of pixel circuits.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
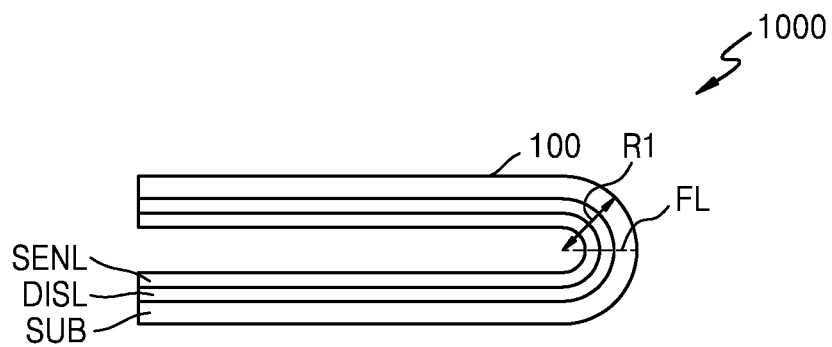
Figure 3:
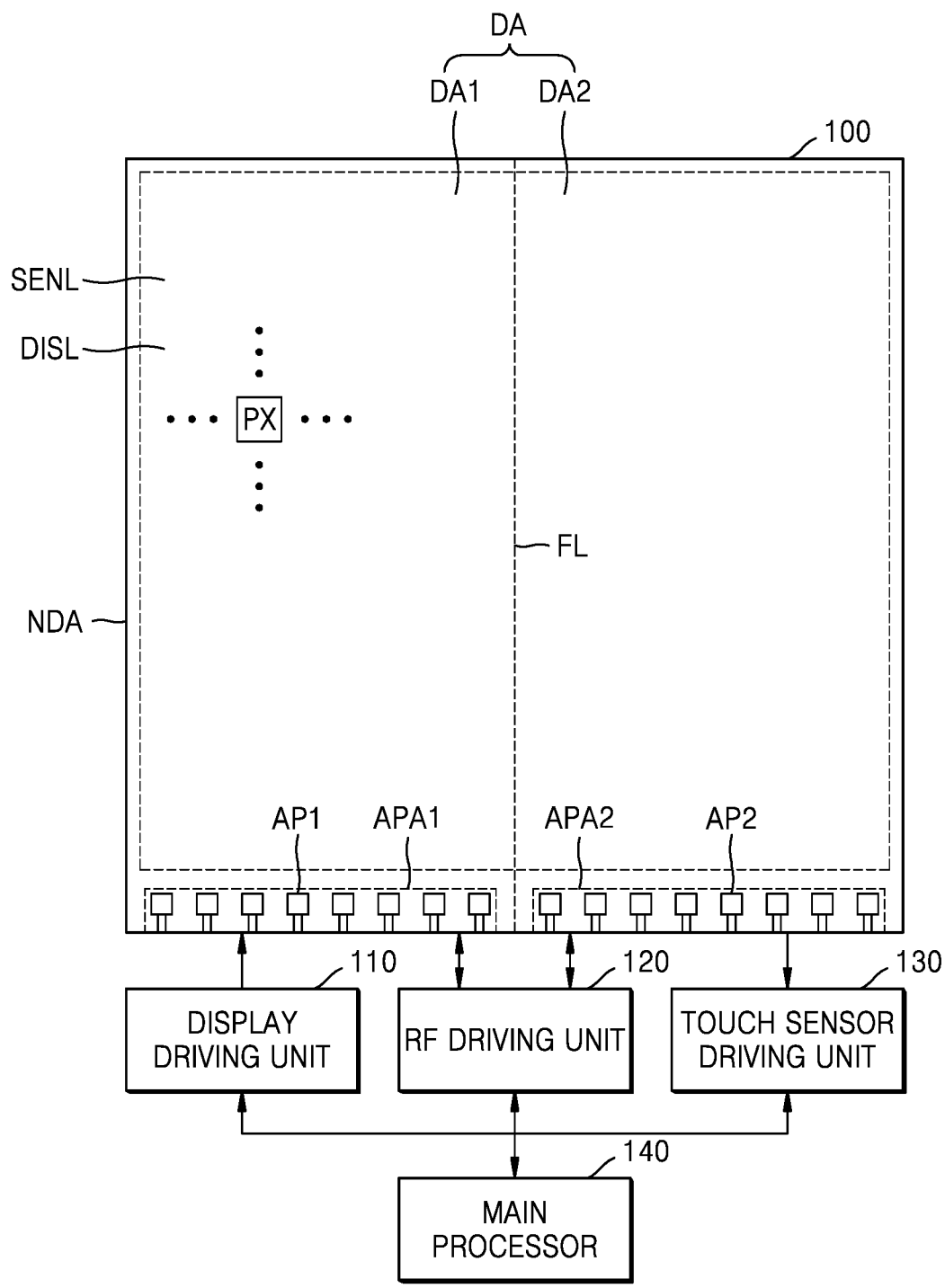
FIG. 3 is a schematic block diagram of a portion of the electronic device of FIGS. 1 and 2.

FIGS. 1 and 2 are schematic cross-sectional views of an electronic device 1000 according to an embodiment, and FIG. 3 is a schematic block diagram of a portion of the electronic device 1000 of FIGS. 1 and 2.

Referring to FIGS. 1 to 3, the electronic device 1000 includes a foldable display panel 100. The electronic device 1000 may be a device that displays a video and/or a still image, and may be a portable electronic device, for example, such as a mobile phone, a smart phone, a tablet personal computer (PC), a mobile communication terminal, an electronic notebook, an electronic book, a portable multimedia player (PMP), a navigation device, an Ultra Mobile PC (UMPC), and/or the like. The electronic device 1000 may be a wearable device, for example, such as a smart watch, a watch phone, a glasses-type display, a head mounted display (HMD), and/or the like. Hereinafter, the electronic device 1000 is illustrated in the context of a smart phone, but the present disclosure is not limited thereto.

The foldable display panel 100 includes a substrate SUB, a display layer DISL, and a sensor electrode layer SENL. The substrate SUB includes a first area AR1 and a second area AR2. The display layer DISL is arranged on the substrate SUB, and includes a first display area (e.g., DA1 in FIG. 3) at (e.g., in or on) the first area AR1, and a second display area (e.g., DA2 in FIG. 3) at (e.g., in or on) the second area AR2. The sensor electrode layer SENL may be arranged on the display layer DISL, and may include sensor electrodes, connecting units (e.g., connectors), and conductive patterns arranged to sense a user's touch input.

The sensor electrode layer SENL may include first patch antennas AP1 arranged at (e.g., in or on) a first antenna area (e.g., APA1 in FIG. 3) at (e.g., in or on) the first area AR1, and second patch antennas AP2 arranged at (e.g., in or on) a second antenna area (e.g., APA2 in FIG. 3) at (e.g., in or on) the second area AR2.

The substrate SUB may be a flexible substrate capable of bending, folding, rolling, and/or the like. The substrate SUB may include an insulating material, for example, such as glass, quartz, or a polymer resin. However, the present disclosure is not limited thereto, and the substrate SUB may be a rigid substrate.

The display layer DISL may be arranged on the substrate SUB. The display layer DISL may be a layer including pixels PX and for displaying an image. The display layer DISL may include a thin-film transistor layer on which thin-film transistors are formed, a light-emitting element layer on which light-emitting elements for emitting light are formed, and an encapsulation layer configured to seal the light-emitting element layer.

The display layer DISL may be divided into a display area DA in which pixels PX are arranged to display an image, and a non-display area NDA in which an image is not displayed. The display area DA includes the first display area DA1 overlapping with the first area AR1, and the second display area DA2 overlapping with the second area AR2. The non-display area NDA may be arranged to surround (e.g., around a periphery of) the display area DA. In addition to the pixels PX, scan lines, data lines, power lines, and/or the like that are connected to the pixels PX may be arranged at (e.g., in or on) the display area DA. A scan driving unit (e.g., a scan driver) configured to apply scan signals to the scan lines, fan-out lines connecting the data lines to a display driving unit (e.g., a display driver) 110, and/or the like may be arranged at (e.g., in or on) the non-display area NDA.

The sensor electrode layer SENL may be arranged on the display layer DISL. The sensor electrode layer SENL may be a layer including sensor electrodes, and may be configured to sense whether a user provides a touch (e.g., a user provides a touch input). The sensor electrode layer SENL may include a first electrode layer on which the sensor electrodes are arranged, and a second electrode layer on which connecting electrodes for connecting driving electrodes from among the sensor electrodes are arranged.

The sensor electrode layer SENL may include a sensor area at (e.g., in or on) which the sensor electrodes are arranged to sense a user's touch input, and a sensor peripheral area at (e.g., in or on) which the sensor electrodes area not arranged. The sensor electrodes, connecting units (e.g., the connecting electrodes), and conductive patterns may be arranged at (e.g., in or on) the sensor area, and the sensor lines connected to the sensor electrodes may be arranged at (e.g., in or on) the sensor peripheral area.

The sensor electrode layer SENL may sense a user's touch input by using at least one of various touch methods, for example, such as a resistive film method, a capacitive method, or the like. For example, when the sensor electrode layer SENL senses a user's touch input by using the capacitive method, a touch sensor driving unit (e.g., a touch sensor driver) 130 may determine whether a user provides a touch (e.g., provides the touch input) by applying driving signals to the driving electrodes from among the sensor electrodes, and sensing voltages charged in mutual capacitances (hereinafter referred to as "mutual capacities") between the driving electrodes and sensing electrodes through the sensing electrodes from among the sensor electrodes.

A user's touch may include a contact touch and a proximity touch. The contact touch refers to a touch in which an object, for example, such as a user's finger, a pen, and/or the like, directly contacts a cover window located above the sensor electrode layer SENL. The proximity touch refers to a touch in which an object, for example, such as a user's finger, a pen, and/or the like, is positioned proximately on the cover window, for example, such as hovering proximately to (e.g., near) the cover window.

The touch sensor driving unit 130 may transmit sensor data to a main processor 140 according to sensed voltages, and the main processor 140 may calculate touch coordinates at (e.g., in or on) which a touch input has occurred by analyzing the sensor data.

The sensor electrode layer SENL may include the first antenna area APA1 at (e.g., in or on) which the first patch antennas AP1 are arranged, and the second antenna area APA2 at (e.g., in or on) which the second patch antennas AP2 are arranged. Although eight first patch antennas AP1 and eight second patch antennas AP2 are illustrated in FIG. 3, the present disclosure is not limited thereto. For example, in some embodiments, the number of the first patch antennas AP1 and the number of the second patch antennas AP2 may be greater than eight. In another example, in some embodiments, the number of the first patch antennas AP1 and the number of the second patch antennas AP2 may be less than eight.

The sensor electrode layer SENL may include the first patch antennas AP1 arranged at (e.g., in or on) the first antenna area APA1 in the first area AR1, and the second patch antennas AP2 arranged at (e.g., in or on) the second antenna area APA2 in the second area AR2. The first patch antennas AP1 and the second patch antennas AP2 are configured to perform wireless communication of the electronic device 1000, and may be arranged at (e.g., in or on) the sensor peripheral area. According to another embodiment, the first patch antennas AP1 and the second patch antennas AP2 may be arranged at (e.g., in or on) the sensor area. The first patch antennas AP1 and the second patch antennas AP2 are configured to perform fifth-generation (5G) mobile communication, and may be formed as a quadrangular patch on a plane.

To achieve higher data rates, implementation of 5G communication systems in higher frequency (mmWave) bands, for example, 60-Ghz bands, is being considered. To reduce propagation loss and to increase a transmission range for 5G communication systems, various technologies, for example, such as beamforming, massive multiple-input and multiple-output (MIMO), full-dimension MIMO (FD-MIMO), array antennas, analog beamforming, and large-scale antennas, are being studied.

The first antenna area APA1 may overlap with the first area AR1, and the second antenna area APA2 may overlap with the second area AR2. According to another embodiment, the first antenna area APA1 and the second antenna area APA2 may be arranged at (e.g., in or on) the sensor peripheral area located outside at least three sides of the sensor area.

An antenna pattern for radio frequency identification (RFID) tags for short-range communication may be arranged on the sensor electrode layer SENL, and the antenna pattern for RFID tags may be formed in a loop shape or a coil shape.

The foldable display panel 100 may be a light-emitting display panel including a light-emitting element. For example, the foldable display panel 100 may be an organic light-emitting display panel using an organic light-emitting diode including an organic light-emitting layer, a micro light-emitting diode display panel using a micro light-emitting diode (LED), a quantum dot light-emitting display panel using a quantum dot light-emitting diode including a quantum dot light-emitting layer, or an inorganic light-emitting display panel using an inorganic light-emitting element including an inorganic semiconductor.

The foldable display panel 100 may operate in one of an unfolding mode, in which the foldable display panel 100 is unfolded in a plane as shown in FIG. 1, and a folding mode, in which the foldable display panel 100 is folded along a folding line FL as shown in FIG. 2. The term "foldable" may refer to a feature in which the foldable display panel 100 may be folded at a particular portion along the folding line FL.

The foldable display panel 100 may operate in one of a first mode, in which an image is displayed at (e.g., in or on) one of the first display area DA1 and the second display area DA2 of the display layer DISL, and a second mode, in which an image is displayed at (e.g., in or on) both of the first display area DA1 and the second display area DA2 of the display layer DISL. The first mode may be referred to as a half display mode, and the second mode may be referred to as a full display mode. For example, the foldable display panel 100 may operate in the half display mode when in the folding mode, and may operate in the full display mode when in the unfolding mode. According to an embodiment, the foldable display panel 100 may also operate in the half display mode even when in the unfolding mode.

The display layer DISL may include a bending area and a non-bending area along the folding line FL. The bending area may be an area adjacent to the folding line FL, and the non-bending area may be an area outside of the bending area (e.g., an area of the display layer DISL excluding the bending area). A boundary between the bending area and the non-bending area may not be clear (e.g., may not be well defined). At the bending area, the display layer DISL may be bent when in the folding mode and unbent (e.g., unfolded) when in the unfolding mode, based on (e.g., along) the folding line FL. At the non-bending area, the display layer DISL may not be bent in both of the folding mode and unfolding mode. The term "bending" may refer to the foldable display panel 100 that is bent or folded in a particular shape by an external force. The sensor electrode layer SENL may also include a bending area and a non-bending area along the folding line FL.

Referring to FIG. 2, the foldable display panel 100 may be bent in a direction based on the folding line FL in the folding mode. As shown in FIG. 2, the foldable display panel 100 may be bent inward in the folding mode, such that both portions (e.g., a portion corresponding to the first area AR1 and another portion corresponding to the second area AR2) of the sensor electrode layer SENL faces each other. In some embodiments, the foldable display panel 100 may be bent outward in the folding mode, such that both portions (e.g., a portion corresponding to the first area AR1 and another portion corresponding to the second area AR2) of the substrate SUB faces each other.

When the foldable display panel 100 is folded, the bending area around (e.g., adjacent to) the folding line FL may have a first radius of curvature R1, and the first radius of curvature R1 may be, for example, about 1 mm to about 10 mm.

In FIG. 2, when the foldable display panel 100 is folded, a distance between portions of the foldable display panel 100 which is folded to face each other is shown to be constant or substantially constant, but the present disclosure is not limited thereto, and the distance between the portions of the foldable display panel 100 that are folded to face each other may not be constant. In addition, in FIGS. 1 and 2, when the foldable display panel 100 is folded based on (e.g., along) the folding line FL, areas of the foldable display panel 100 which is folded to face each other are shown to be identical or substantially identical to each other, but the present disclosure is not limited thereto, and areas of the foldable display panel 100 which is folded to face each other may be different from each other. For example, one area (e.g., one portion corresponding to the first area AR1 or the second area AR2) may be larger (e.g., longer and/or wider) than the other area (e.g., the other portion from among the first area AR1 and the second area AR2).

The display driving unit 110 drives the foldable display panel 100. The display driving unit 110 may receive control signals and power voltages, and may generate and output signals and power voltages for driving the foldable display panel 100. The display driving unit 110 may be formed as an integrated circuit (IC).

The display driving unit 110 may, under a control of the main processor 140, control the foldable display panel 100 to display an image only through one of the first display area DA1 and the second display area DA2 when in the half display mode (e.g., the first mode), and may control the foldable display panel 100 to display an image through both of the first display area DA1 and the second display area DA2 when in the full display mode (e.g., the second mode).

The touch sensor driving unit 130 may be electrically connected to the sensor electrodes in the sensor electrode layer SENL of the display panel 100 through a display circuit board. The touch sensor driving unit 130 may be formed as an IC.

A radio frequency (RF) driving unit (e.g., an RF driver) 120 drives the first patch antennas AP1 and the second patch antennas AP2. The RF driving unit 120 may drive the first patch antennas AP1 and the second patch antennas AP2 to process a RF signal transmitted or received from at least one of the first patch antennas AP1 and the second patch antennas AP2. For example, the RF driving unit 120 may change a phase and/or amplify the amplitude of a RF signal received through the first patch antennas AP1 or the second patch antennas AP2, or received through the first patch antennas AP1 and the second patch antennas AP2. The RF driving unit 120 may be electrically connected to the first patch antennas AP1 and the second patch antennas AP2. The RF driving unit 120 may be formed as an IC.

The RF driving unit 120 may transmit, to a mobile communication module (e.g., a mobile communication device), the RF signal of which the phase is changed and/or amplitude is amplified. The RF driving unit 120 may change the phase and/or amplify the amplitude of a RF signal transmitted from the mobile communication module. The RF driving unit 120 may transmit, to the first patch antennas AP1 and the second patch antennas AP2, the RF signal of which the phase is changed and/or amplitude is amplified.

In the half display mode (e.g., the first mode), under the control of the main processor 140, the RF driving unit 120 may transmit and receive a RF signal by using the first patch antennas AP1 or the second patch antennas AP2 corresponding to any one of the first display area DA1 and the second display area DA2 where an image is displayed. When an image is displayed through the first display area DA1, the RF driving unit 120 may perform wireless data communication by using the first patch antennas AP1. When an image is displayed through the second display area DA2, the RF driving unit 120 may perform wireless data communication by using the second patch antennas AP2. In the full display mode (e.g., the second mode), under the control of the main processor 140, the RF driving unit 120 may transmit and receive a RF signal by using the first patch antennas AP1 and the second patch antennas AP2.

The main processor 140 may control various functions (e.g., all functions) of the electronic device 1000. For example, the main processor 140 may control operations of the display driving unit 110, the touch sensor driving unit 130, and the RF driving unit 120. The main processor 140 may be an application processor including an IC, a central processing unit, or a system chip.

The main processor 140 may control the display driving unit 110 and the RF driving unit 120 to perform wireless data communication by using the first patch antennas AP1 or the second patch antennas AP2 in the half display mode (e.g., the first mode) in which an image is displayed through any suitable one of the first display area DA1 and the second display area DA2. According to an embodiment, when an image is displayed through the first display area DA1, the main processor 140 may control the display driving unit 110 and the RF driving unit 120 to perform wireless data communication by using the first patch antennas AP1 corresponding to the first display area DA1. When an image is displayed through the second display area DA2, the main processor 140 may control the display driving unit 110 and the RF driving unit 120 to perform wireless data communication by using the second patch antennas AP2 corresponding to the second display area DA2.

The main processor 140 may control the display driving unit 110 and the RF driving unit 120 to perform wireless data communication by using the first patch antennas AP1 and/or the second patch antennas AP2 in the full display mode (e.g., the second mode) in which an image is displayed through both of the first display area DA1 and the second display area DA2.

According to an embodiment, the number of the first patch antennas AP1 may be eight, and the number of the second patch antennas AP2 may be eight, but the present disclosure is not limited thereto.

When the number of the first and second patch antennas AP1 and AP2 are each eight, the eight first patch antennas AP1 or the eight second patch antennas AP2 may be used in wireless data communication when in the half display mode (e.g., the first mode). According to an embodiment, eight patch antennas of the electronic device 1000 may wirelessly transmit and receive data to and from eight patch antennas of other communication devices by using 8×8 MIMO technology.

According to another embodiment, eight patch antennas of the electronic device 1000 may wirelessly transmit and receive data to and from 16 patch antennas of other communication devices by using 16×8 MIMO technology. For example, in the half mode (e.g., the first mode), the electronic device 1000 may receive wireless communication data from a transmitting end having 16 transmitting end patch antennas by using the eight first patch antennas AP1 or the eight second patch antennas AP2. In this case, the eight first patch antennas AP1 or the eight second patch antennas AP2 may be referred to as eight receiving end patch antennas.

In the full display mode (e.g., the second mode), a total of 16 first and second patch antennas AP1 and AP2 may be used in wireless data communication. According to an embodiment, 16 patch antennas of the electronic device 1000 may wirelessly transmit and receive data to and from 16 patch antennas of other communication devices by using 16×16 MIMO technology.

According to another embodiment, 16 patch antennas of the electronic device 1000 may wirelessly transmit and receive data to and from eight patch antennas of other communication devices by using 8×16 MIMO technology. For example, in the full display mode (e.g., the second mode), the electronic device 1000 may receive wireless communication data from a transmitting end having eight transmitting end patch antennas by using the eight first patch antennas AP1 and the eight second patch antennas AP2. In this case, the eight first patch antennas AP1 and the eight second patch antennas AP2 may be collectively referred to as 16 receiving end patch antennas.

A flexible film may be attached to an edge of the foldable display panel 100. For example, a side (e.g., a surface) of the flexible film may be attached to an edge of the foldable display panel 100 by using an anisotropic conductive film. The flexible film may be a flexible film such that it may be bent.

A display circuit board may be attached to another side (e.g., another surface) of the flexible film. The other side of the flexible film may be attached to a top surface of the display circuit board by using an anisotropic conductive film. According to an embodiment, the display driving unit 110 and the RF driving unit 120 may be arranged above the flexible film. The touch sensor driving unit 130 may be attached above the display circuit board.

A power supply unit (e.g., a power supply or a power supply circuit) configured to supply driving voltages for driving the pixels PX of the foldable display panel 100, the scan driving unit, and the display driving unit 110 may be arranged above the display circuit board. The power supply unit may be integrated with the display driving unit 110, and in this case, the display driving unit 110 and the power supply unit may be formed as one IC (e.g., as the same IC).

Figure 4:
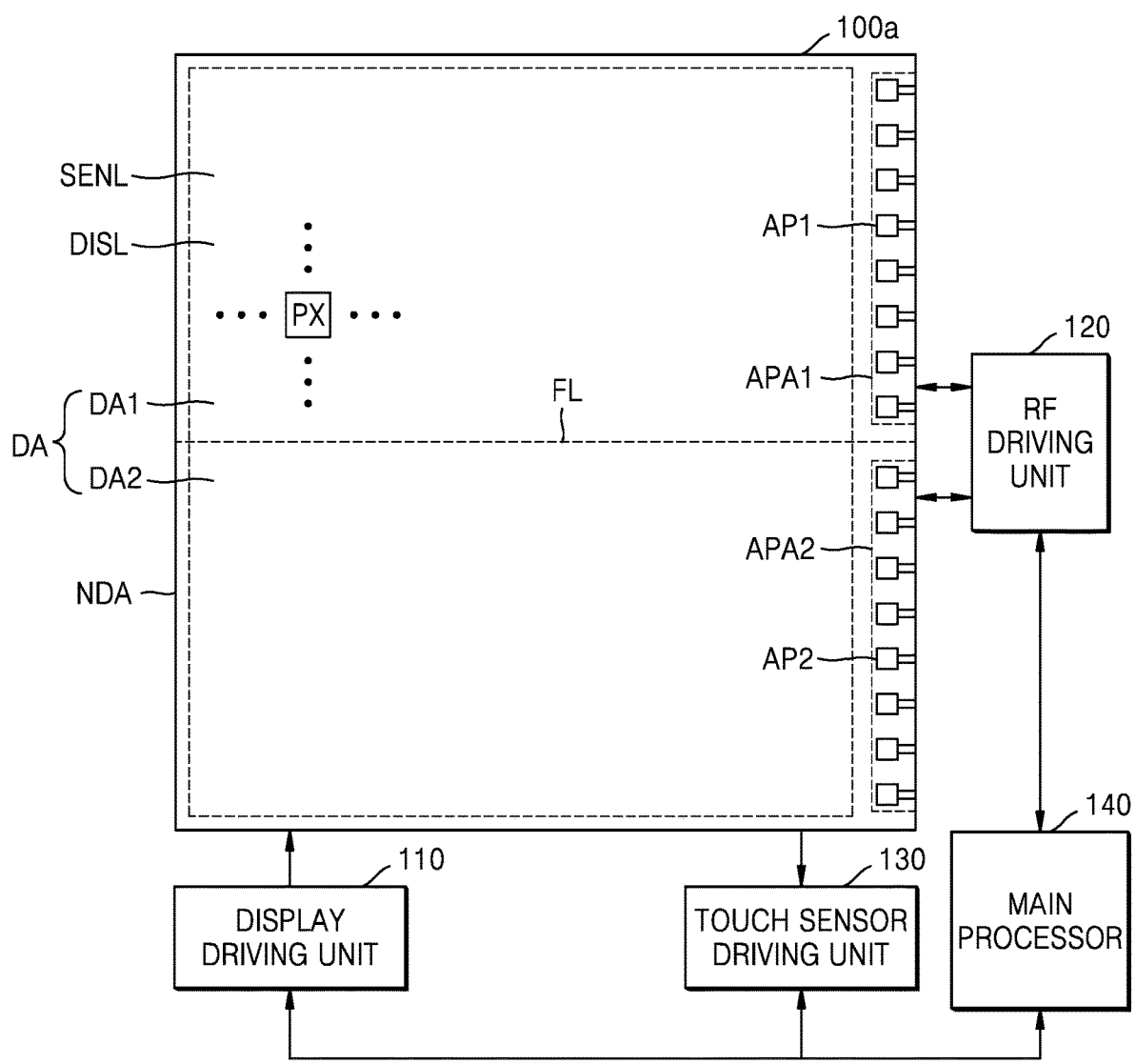
FIG. 4 is a schematic block diagram of a foldable display panel according to another embodiment.

FIG. 4 is a schematic block diagram of a foldable display panel 100a according to another embodiment.

Referring to FIG. 4, the foldable display panel 100a may be the same or substantially the same as the foldable display panel 100 of FIG. 3, except for a location of the folding line FL. Accordingly, redundant description thereof may be simplified or may not be repeated.

Because the folding line FL extends vertically in the foldable display panel 100 shown in FIG. 3, the foldable display panel 100 of FIG. 3 may have a structure that is folded horizontally (e.g., folded in a horizontal direction). On the other hand, because the folding line FL in the foldable display panel 100a of FIG. 4 extends horizontally, the foldable display panel 100a of FIG. 4 may be folded vertically (e.g., folded in a vertical direction).

In this case, the first display area DA1 and the second display area DA2 are vertically arranged, and the first antenna area APA1 and the second antenna area APA2 are also vertically arranged. The foldable display panel 100a also includes the first patch antennas AP1 arranged at (e.g., in or on) the first antenna area APA1, and the second patch antennas AP2 arranged at (e.g., in or on) the second antenna area APA2.

The RF driving unit 120 may be connected to the first patch antennas AP1 and the second patch antennas AP2, and may be arranged above another flexible film attached to the foldable display panel 100a.

Figure 5:
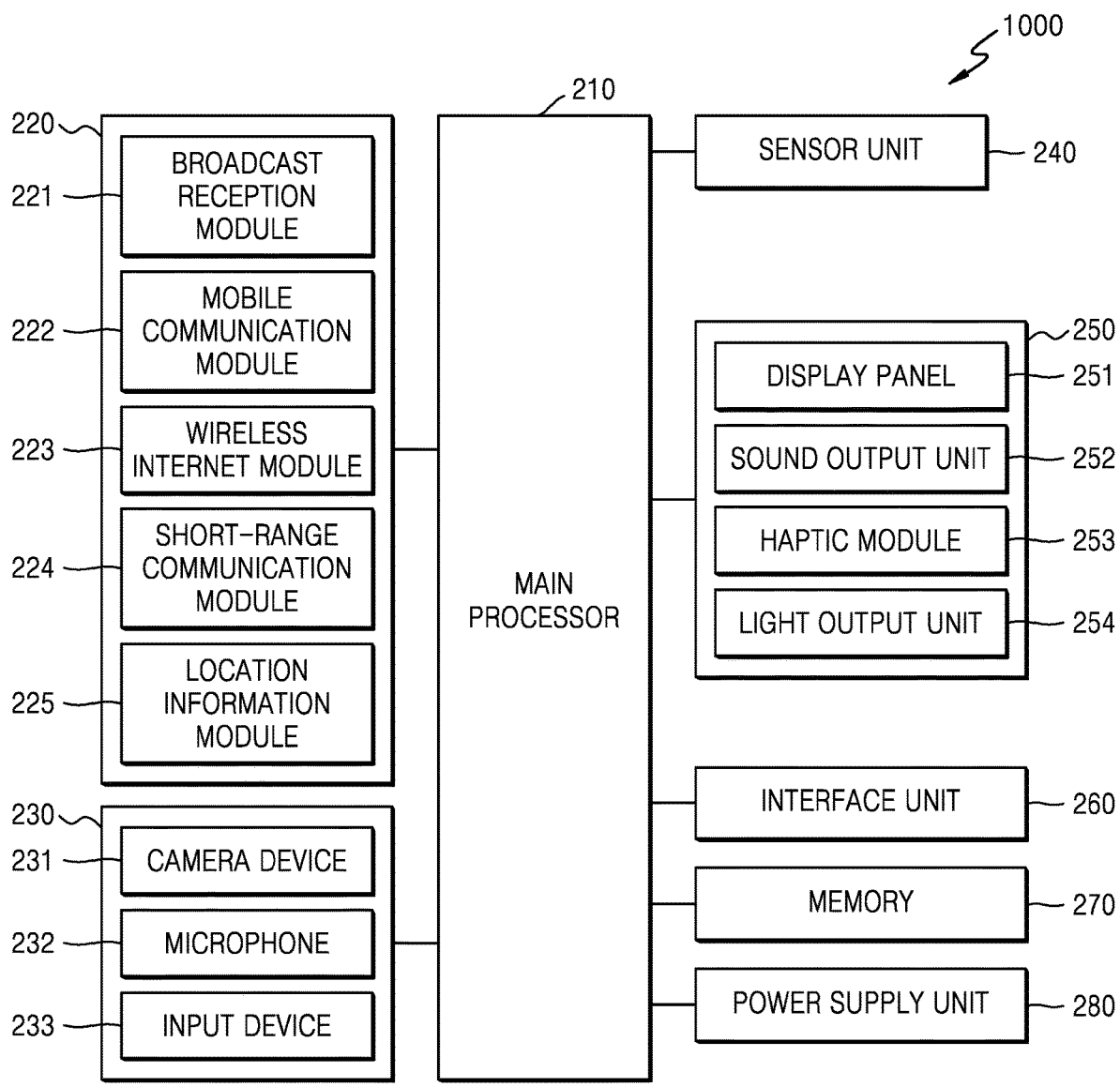
FIG. 5 is a schematic block diagram of an electronic device according to an embodiment.

FIG. 5 is a schematic block diagram of the electronic device 1000 according to an embodiment.

Referring to FIG. 5, the electronic device 1000 includes a main processor 210, a wireless communication unit (e.g., a wireless communication circuit) 220, an input unit (e.g., an input circuit) 230, a sensor unit (e.g., a sensor circuit) 240, an output unit (e.g., an output circuit) 250, an interface unit (e.g., an interface circuit) 260, a memory 270, and a power supply unit (e.g., a power supply or a power supply circuit) 280. The main processor 210 may correspond to the main processor 140 of FIG. 3.

A display panel 251 may correspond to the foldable display panel 100 of FIG. 3 or the foldable display panel 100a of FIG. 4. A flexible film may be attached to the display panel 251. A side (e.g., a surface) of the flexible film may be attached to the display panel 251, and the other side (e.g., the other surface) may be attached to a display circuit board. For example, the display circuit board may be connected to a main circuit board through a cable. The main circuit board may be a printed circuit board or a flexible printed circuit board.

The main circuit board may include the main processor 210, a camera device 231, and a main connector.

The main processor 210 may control various functions (e.g., all functions) of the electronic device 1000. The main processor 210 may output digital video data to the display driving unit 110, such that the display panel 251 displays an image. The main processor 140 may control a mobile communication module (e.g., a mobile communication device). The main processor 140 may wirelessly transmit and receive data through the RF driving unit 120 and the mobile communication module. The main processor 140 may perform an operation corresponding to reception of data, and may transmit data as the operation is performed.

The main processor 210 may receive detection data from the touch sensor driving unit 130, may determine whether a user provides a touch (e.g., a touch input) according to the detection data, and may execute an operation corresponding to a direct touch or proximity touch of the user. For example, the main processor 210 may analyze the detection data to calculate the user's touch coordinates, and then may perform an application indicated by an icon touched by the user and/or perform an operation. The main processor 210 may be an application processor including an IC, a central processing unit, or a system chip.

The camera device 231 may process an image frame, for example, such as a still image, a video, and/or the like, obtained by an image sensor when in a camera mode, and may output the processed image frame to the main processor 210. The camera device 231 may include at least one of a camera sensor (for example, a charge-coupled device (CCD), a complementary metal-oxide-semiconductor (CMOS), and/or the like), a photo sensor (e.g., an image sensor), and/or a laser sensor.

A cable connected to the display circuit board may be connected to the main connector, and thereby, the main circuit board and the display circuit board may be electrically connected to each other.

The main circuit board may further include the wireless communication unit 220, at least one input unit (e.g., at least one input circuit) 230, at least one sensor unit (e.g., at least one sensor circuit) 240, at least one output unit (e.g., at least one output circuit) 250, at least one interface unit (e.g., at least one interface circuit) 260, the memory 270, and the power supply unit 280.

The wireless communication unit 220 may include at least one of a broadcast reception module (e.g., a broadcast reception device) 221, a mobile communication module (e.g., a mobile communication device) 222, a wireless internet module (e.g., a wireless internet device) 223, a short-range communication module (e.g., a short-range communication device) 224, and a location information module (e.g., a location information device) 225.

The broadcast reception module 221 may receive a broadcast signal and/or broadcast related information from an external broadcast management server through a broadcast channel. The broadcast channel may include a satellite channel and/or a terrestrial channel.

The mobile communication module 222 transmits and receives wireless signals to and from at least one of a base station, an external terminal, and a server on a communication network constructed according to various technology standards or various communication methods (for example, such as global system for mobile communication (GSM), code-division multi access (CDMA), code-division multi access 2000 (CDMA2000), evolution-data optimized or evolution-data only (EV-DO), wideband CDMA (WCDMA), high speed downlink packet access (HSDPA), high speed uplink packet access (HSUPA), long term evolution (LTE), long term evolution-advance (LTE-A), and/or the like) for mobile communication. The wireless signals may include various types of data according to transmission and reception of a voice call signal, a video call signal, a text/multimedia message, and/or the like.

The wireless internet module 223 refers to a module configured to perform wireless Internet access. The wireless internet module 223 may be configured to transmit and receive wireless signals in a communication network according to various wireless Internet technologies. Wireless Internet technologies may include, for example, Wireless Lan (WLAN), Wireless-Fidelity (Wi-Fi), Wi-Fi Direct, Digital Living Network Alliance (DLNA), and/or the like.

The short-range communication module 224 is a module configured to perform short-range communication, and may support short-range communication by using at least one of Bluetooth™, RFID, infrared data association (IrDA), ultra-wideband (UWB), ZigBee, near-field communication (NFC), Wi-Fi, Wi-Fi Direct, wireless universal serial bus (USB) technology, and/or the like. The short-range communication module 224 may support, through a wireless local area network, wireless communication between the electronic device 1000 and a wireless communication system, wireless communication between the electronic device 1000 and other electronic devices, wireless communication between the electronic device 1000 and a network in which other electronic devices (or external servers) are located, and/or the like. The wireless local area network may be a wireless personal area network. The other electronic devices may be a wearable device capable (or interoperable) of exchanging data with the electronic device 1000.

The location information module 225 is a module configured to obtain a location (e.g., a current location) of the electronic device 1000, and an example thereof may be a global positioning system (GPS) module (e.g., a GPS device), a Wi-Fi module (e.g., a Wi-Fi device), and/or the like. For example, when the electronic device 1000 uses the GPS module, a location of the electronic device 1000 may be obtained by using a signal transmitted from a GPS satellite. In another example, when the electronic device 1000 uses the Wi-Fi module, the location of the electronic device 1000 may be obtained based on information of a wireless access point (AP) that transmits or receives wireless signals to and from the Wi-Fi module. However, the present disclosure is not limited to the above examples, and the location information module 225 is a module used to obtain a location (e.g., a current location) of the electronic device 1000, and thus, is not limited to a module that directly calculates or obtains the location of the electronic device 1000.

The input unit 230 may include an image input unit (e.g., an image input device), for example, such as the camera device 231 configured to input an image signal, a sound input unit (e.g., a sound input device), for example, such as a microphone 232 configured to input a sound signal, an input device 233 configured to receive information from a user, and/or the like.

The camera device 231 processes an image frame such as a still image and/or a video obtained by an image sensor in a video call mode or a shooting mode. The processed image frame may be displayed on the display panel 251 or may be stored in the memory 270.

The microphone 232 processes external sound signals as electrical voice data. The processed voice data may be variously used according to a function (e.g., an application being executed), which is being performed by the electronic device 1000. Various suitable noise removal algorithms configured to remove noise generated in an operation of receiving an external sound signal may be implemented in the microphone 232.

The main processor 210 may control an operation of the electronic device 1000 to correspond to information input through the input device 233. The input device 233 may include a mechanical input unit (e.g., a mechanical input device) or a touch input unit (e.g., a touch input device) such as a button, a dome switch, a jog wheel, a jog switch, and/or the like located on a back surface or a side surface of the electronic device 1000. The touch input unit may include (e.g., may be formed of) the sensor electrode layer SENL of the display panel 251.

The sensor unit 240 may include at least one sensor which senses at least one of information in the electronic device 1000, surrounding environment information surrounding the electronic device 1000, and user information. The sensor unit 240 may generate a sensing signal corresponding to the at least one of information in the electronic device 1000, surrounding environment information surrounding the electronic device 1000, and user information. The main processor 210 may, based on the sensing signal, control the driving and/or operation of the electronic device 1000, or may perform a data processing, function, or operation related to an application installed on (e.g., in) the electronic device 1000. The sensor unit 240 may include at least one of a proximity sensor, an illumination sensor, an acceleration sensor, a magnetic sensor, a gravity sensor (G-sensor), a gyroscope sensor, a motion sensor, a red, green, or blue (RGB) sensor, an infrared (IR) sensor, a finger scan sensor, an ultrasonic sensor, an optical sensor, a battery gauge, an environmental sensor (for example, a barometer, a hygrometer, a thermometer, a radioactive sensor, a thermal sensor, a gas sensor, and/or the like), and a chemical sensor (for example, an electronic nose, a health care sensor, a biometric sensor, and/or the like).

The proximity sensor refers to a sensor that senses, without a mechanical contact, an object approaching a certain detection surface, or whether an object is present in the vicinity by using an electromagnetic force, infrared rays, or the like. Examples of the proximity sensor include a transmission type photoelectric sensor, a direct reflection type photoelectric sensor, a mirror reflection type photoelectric sensor, a high-frequency oscillation type proximity sensor, a capacitive type proximity sensor, a magnetic type proximity sensor, an infrared proximity sensor, and/or the like. The proximity sensor may sense a proximity touch and also a proximity touch pattern, for example, such as a proximity touch distance, a proximity touch direction, a proximity touch speed, a proximity touch time, a proximity touch location, and/or a proximity touch movement status. The main processor 210 processes data (e.g., information) corresponding to a proximity touch operation and the proximity touch pattern sensed through the proximity sensor, and may control to display visual information corresponding to the processed data on the display panel 251.

The ultrasonic sensor may recognize object information by using ultrasonic waves. The main processor 210 may calculate a location of an object through information sensed from the optical sensor and a plurality of ultrasonic sensors. Because the speed of light is different from the speed of ultrasonic waves, the location of the object may be calculated by using the time when light reaches the optical sensor and the time when the ultrasonic waves reach the ultrasonic sensor.

The output unit 250 is a unit configured to generate an output related to vision, hearing, sense of touch, and/or the like. The output unit 250 may include, for example, at least one of the display panel 251, a sound output unit (e.g., a sound output circuit or a sound output device) 252, a haptic module (e.g., a haptic device) 253, and a light output unit (e.g., a light output circuit or a light output device) 254.

The display panel 251 displays information processed by the electronic device 1000. For example, the display panel 251 may display execution screen information of an application driven by the electronic device 1000 or a user interface (UI) or graphic user interface information (GUI) according to the execution screen information. The display panel 251 may include the display layer DISL for displaying an image, and the sensor electrode layer SENL for sensing a user's touch input. Therefore, the display panel 251 may function as one of the input devices 233 for providing an input interface between the electronic device 1000 and the user, and at the same time, may function as one of the output units 250 for providing an output interface between the electronic device 1000 and the user.

The sound output unit 252 may output sound data received from the wireless communication unit 220 or stored in the memory 270 in a call reception mode, call mode or recoding mode, voice recognition mode, broadcast reception mode, and/or the like. The sound output unit 252 may also output sound signals related to various functions (for example, a call signal reception sound, a message reception sound, and/or the like) performed by the electronic device 1000. The sound output unit 252 may include a receiver and a speaker. At least one of the receiver and the speaker may be a sound generating device, which is attached to a lower portion of the display panel 251, and may vibrate the display panel 251 to output sound. The sound generating device may be a piezoelectric element or a piezoelectric actuator, which contracts and expands according to an electrical signal, or may be an exciter that vibrates the display panel 251 by generating a magnetic force using a voice coil.

The haptic module 253 generates various effects of sense of touch that the user may feel. The haptic module 253 may provide vibration to the user as an effect of sense of touch. The intensity, pattern, and/or the like of the vibration generated by the haptic module 253 may be controlled by the user's selection or a setting of the main processor 210. For example, the haptic module 253 may synthesize vibrations that are different from each other to output or sequentially output the different vibrations. In addition to vibration, the haptic module 253 may generate various effects of sense of touch, for example, such as an effect due to stimulation such as a pin arrangement vertically moving against a contacting skin surface, spray power or suction power of air through a spray hole or an inlet hole, grazing on the skin surface, electrode contact, electrostatic force, and/or the like, and an effect of reproducing a feeling of cold and warmth using an element capable of absorbing heat or generating heat, and/or the like. The haptic module 253 may not only delivers an effect of sense of touch through direct contact, but may also be implemented such that a user may feel an effect of sense of touch through muscle sensations, for example, such as in the fingers or arms.

The light output unit 254 may output a signal for notifying the occurrence of an event by using light of a light source. Examples of events generated in the electronic device 1000 may include reception of messages, reception of call signals, missed calls, alarms, schedule notifications, reception of emails, and reception of information through applications. The signal output from the light output unit 254 is implemented as the electronic device 1000 emits light of a single color or a plurality of colors to a front surface or a back surface thereof. The signal output may be terminated by the electronic device 1000 when sensing a user's event confirmation.

The interface unit 260 serves as a passage with various types of external devices connected to the electronic device 1000. The interface unit 260 may include at least one of a wired/wireless headset port, an external charger port, a wired/wireless data port, a memory card port, a port connected to a device equipped with an identification module, an audio input/output (I/O) port, a video I/O port, and an earphone port. The electronic device 1000 may perform appropriate control related to a connected external device in response to the external device being connected to the interface unit 260.

The memory 270 stores data supporting various functions of the electronic device 1000. The memory 270 may store a plurality of application programs driven by the electronic device 1000, data and commands for operations of the electronic device 1000, and/or the like. At least some of the plurality of application programs may be downloaded from external servers through wireless communication. The memory 270 may store an application for an operation of the main processor 210, and may temporarily store input/output data, for example, data such as a phone book, message, still image, video, and/or the like. In addition, the memory 270 may store haptic data for vibration of various patterns provided to the haptic module 253, and acoustic data related to various sounds provided to the sound output unit 252. The memory 270 may include a storage medium of at least one kind of a flash memory type, a hard disk type, a solid state disk (SSD) type, a silicon disk drive (SDD) type, a multi-media card micro type, a card type memory (for example, a secure digital (SD) memory, an EXtreme digital (XD) memory, and/or the like), random access memory (RAM), static random access memory (SRAM), read-only memory (ROM), electrically erasable programmable read-only memory (EEPROM), programmable read-only memory (PROM), a magnetic memory, a magnetic disk, and an optical disk.

Under a control of the main processor 210, the power supply unit 280 receives external power and internal power to supply power to each component included in the electronic device 1000. The power supply unit 280 may include a battery. In addition, for example, the power supply unit 280 may include a connection port, and the connection port may be configured as an example of the interface unit 260 to which an external charger that supplies power to charge the battery is electrically connected. In another example, the power supply unit 280 may be configured to charge the battery wirelessly without using a connection port. In this case, the battery may receive power from an external wireless power transmitting device by using one or more of an inductive coupling method based on a magnetic induction phenomenon or a magnetic resonance coupling method based on an electromagnetic resonance phenomenon.

Figure 6A:
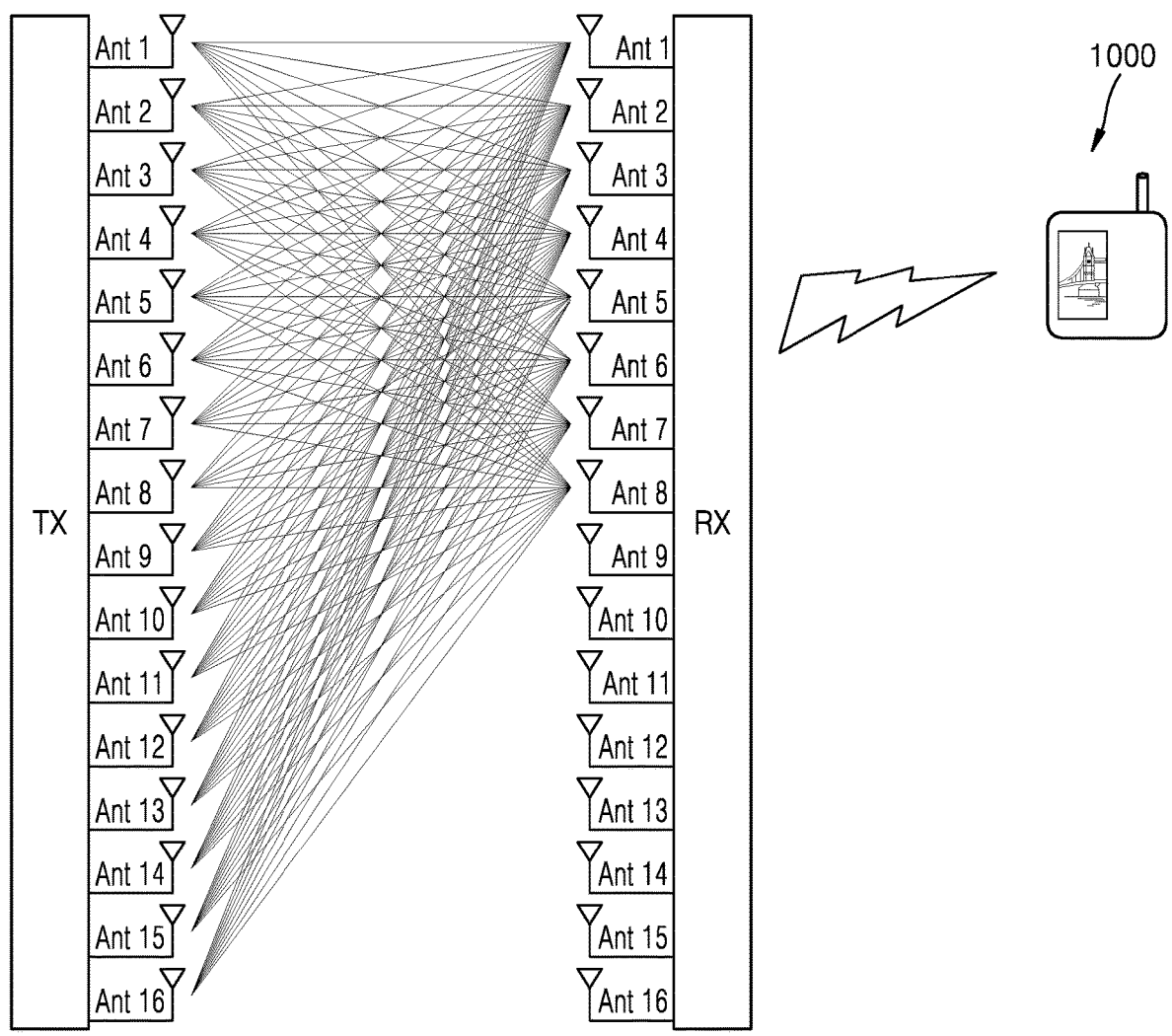
FIGS. 6A-6B are diagrams schematically illustrating a communication method of an electronic device according to an operation mode, according to an embodiment.
Figure 6B:
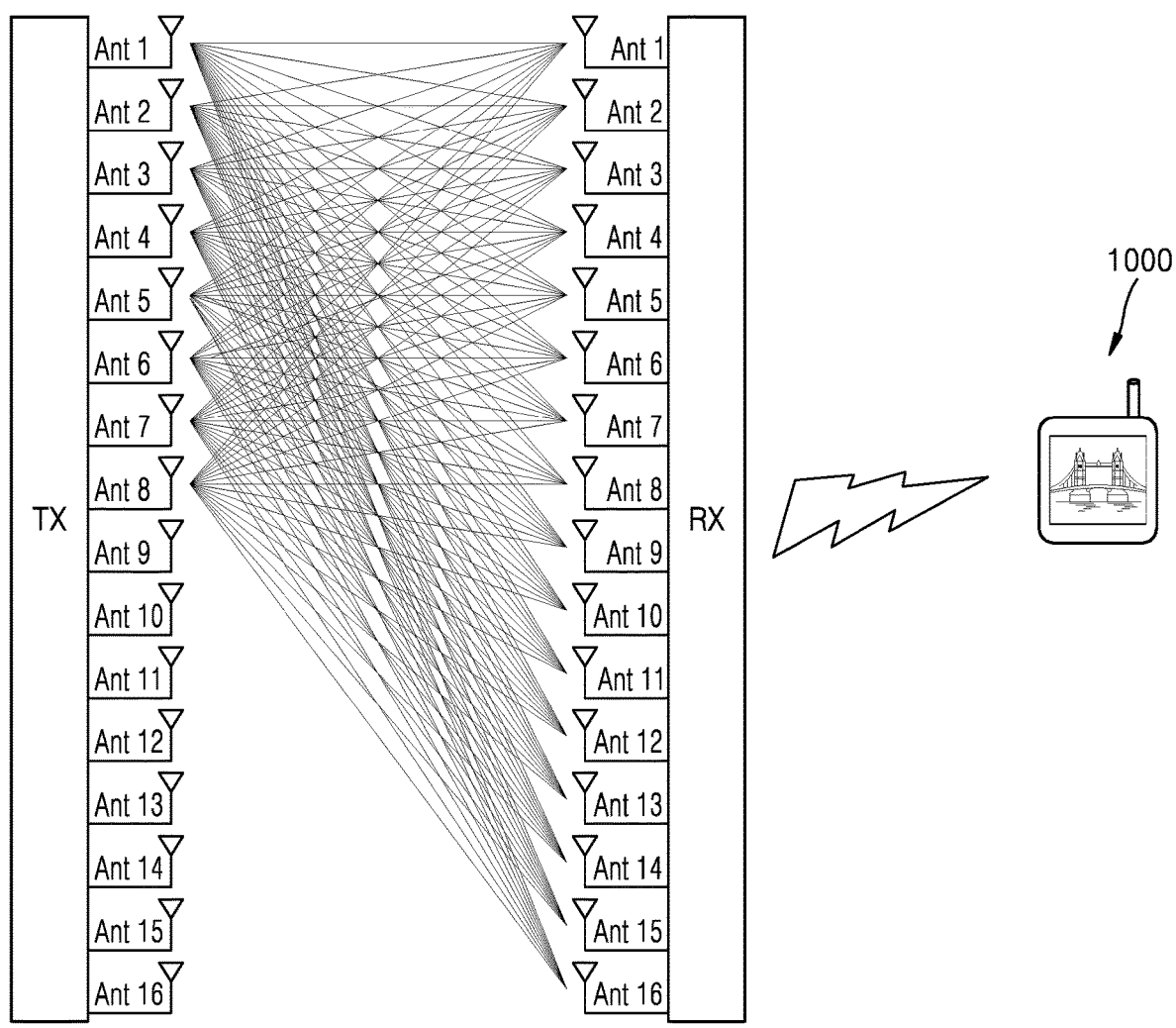

FIGS. 6A and 6B are diagrams schematically illustrating a communication method of the electronic device 1000 according to an operation mode, according to an embodiment.

Referring to FIG. 6A, the electronic device 1000 when operating in the half display mode (e.g., the first mode), for example, such that an image is displayed only through the first display area DA1, may receive a wireless signal from a transmitting end TX by using first to eighth antennas Ant1 to Ant8.

When the electronic device 1000 displays an image through the first display area DA1, the first to eighth antennas Ant1 to Ant8 of a receiving end RX may correspond to the first patch antennas AP1, and the second patch antennas AP2 may correspond to ninth to sixteenth antennas Ant9 to Ant16 of the receiving end RX which may be deactivated. In this case, the first to eighth antennas Ant1 to Ant8 corresponding to the first patch antennas AP1 may receive a wireless signal from first to sixteenth transmitting end antennas Ant1 to Ant16 of the transmitting end TX.

The received wireless signal by the first patch antennas AP1 may be decoded into data by the receiving end RX, and the decoded data may be displayed as an image at (e.g., in or on) the first display area DA1 of the foldable display panel 100 by the display driving unit 110. Although the receiving end RX is shown as being separated from the electronic device 1000 in FIG. 6A for convenience and ease of understanding, the receiving end RX is a component included in the electronic device 1000, as described above with reference to FIG. 5.

According to another embodiment, the first to eighth antennas Ant1 to Ant8 corresponding to the first patch antennas AP1 may receive a wireless signal from first to eighth transmitting end antennas Ant1 to Ant8 of the transmitting end TX.

According to another embodiment, when the electronic device 1000 displays an image through the second display area DA2, the first patch antennas AP1 corresponding to the first to eighth antennas Ant1 to Ant8 of the receiving end RX may be deactivated, and the second patch antennas AP2 corresponding to the ninth to sixteenth antennas Ant9 to Ant16 of the receiving end RX may receive a wireless signal from the first to sixteenth transmitting end antennas Ant1 to Ant16 of the transmitting end TX.

Referring to FIG. 6B, the electronic device 1000 when operating in the full display mode (e.g., the second mode), such that an image is displayed through both the first display area DA1 and the second display area DA2, may receive a wireless signal from the transmitting end TX by using the first to sixteenth antennas Ant1 to Ant16 of the receiving end RX.

The first to eighth antennas Ant1 to Ant8 of the receiving end RX may correspond to the first patch antennas AP1, and the ninth to sixteenth antennas Ant9 to Ant16 of the receiving end RX may correspond to the second patch antennas AP2. Both of the first patch antennas AP1 and the second patch antennas AP2 may be activated when operating in the full display mode (e.g., the second mode). The first patch antennas AP1 and the second patch antennas AP2 may receive a wireless signal from the first to eighth transmitting end antennas Ant1 to Ant8 of the transmitting end TX.

The wireless signal received by the first patch antennas AP1 and the second patch antennas AP2 may be decoded as data by the receiving end RX, and the decoded data may be displayed as an image on the foldable display panel 100 by the display driving unit 110.

Figure 7A:
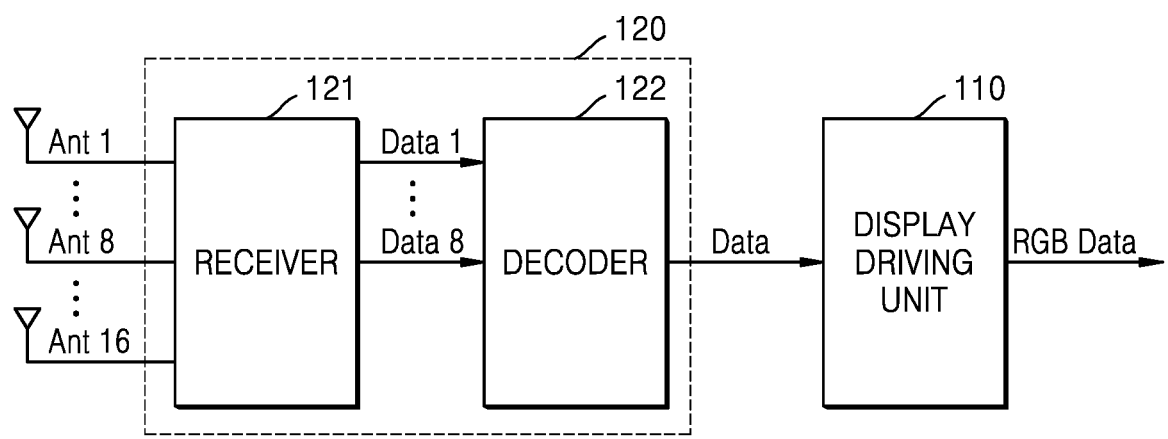
FIGS. 7A-7B are block diagrams schematically illustrating a data reception operation of an electronic device according to an operation mode, according to an embodiment.
Figure 7B:
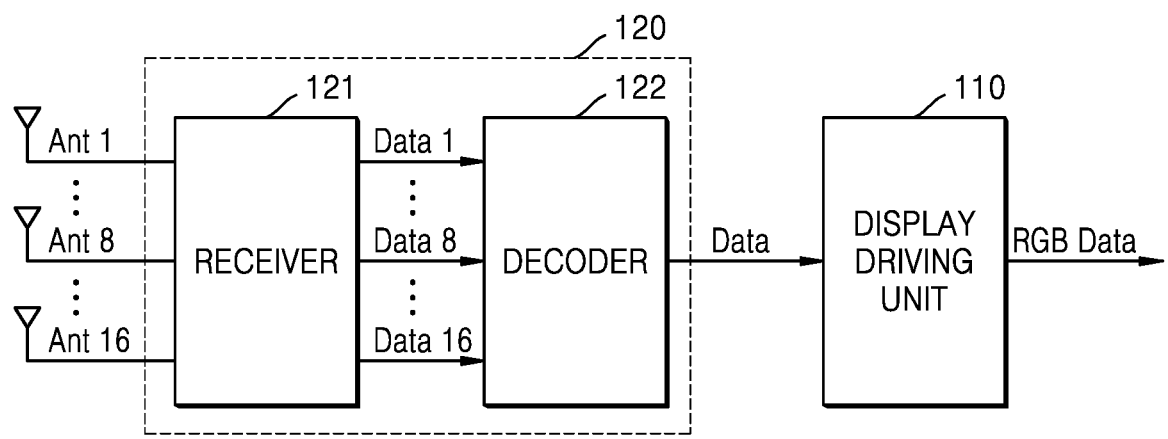

FIGS. 7A and 7B are block diagrams schematically illustrating a data reception operation of the electronic device 1000 according to an operation mode, according to an embodiment.

In FIG. 7A, the electronic device 1000 receives a wireless signal by using the first to eighth antennas Ant1 to Ant8. In FIG. 7B, the electronic device 1000 receives a wireless signal by using the first to sixteenth antennas Ant1 to Ant16.

Referring to FIGS. 7A and 7B, the electronic device 1000 includes the first to sixteenth antennas Ant1 to Ant16, the RF driving unit 120, and the display driving unit 110. The RF driving unit 120 may include a receiver 121 and a decoder 122.

In brief overview, the RF driving unit 120 may include a transmitter and an encoder, and the transmitter and the receiver 121 may configure a radio frequency (RF) transceiver. The decoder 122 may function as a reception processing circuit, and the encoder may function as a transmission processing circuit.

The receiver 121 receives an RF signal from at least some of the first to sixteenth antennas Ant1 to Ant16. The receiver 121 may down-convert the received RF signal to generate an intermediate frequency (IF) or baseband signal. The IF or the baseband signal may be sent to the decoder 122, and the decoder 122 filters, decodes, and/or binarizes the IF or baseband signal to generate a processed baseband signal. The decoder 122 transmits the processed baseband signal to the main processor (e.g., 140 in FIG. 3). When the processed baseband signal is image data, the main processor 140 transmits the image data to the display driving unit 110. The display driving unit 110 may display an image on the foldable display panel 100 by outputting the received image data to the foldable display panel 100.

The encoder receives baseband data (for example, web data, email, or interactive video game data) output from the electronic device 1000, for example, a microphone, the main processor 140, or the like. The encoder encodes, multiplexes, and/or binarizes the output baseband data to generate a processed baseband or IF signal. The transmitter may receive the processed baseband data output from the encoder, and may up-convert the baseband or IF signal transmitted through at least some of the first to sixteenth antennas Ant1 to Ant16 into an RF signal.

In more detail, referring to FIG. 7A, in the half display mode (e.g., the first mode), the first to eighth antennas Ant1 to Ant8 may be activated, and the receiver 121 may receive first to eighth RF signals through the first to eighth antennas Ant1 to Ant8. The receiver 121 may generate first to eighth data Data1 to Data8 corresponding to the first to eighth RF signals, respectively, and may transmit the generated first to eighth data Data1 to Data8 to the decoder 122. The decoder 122 may generate image data Data by decoding the first to eighth data Data1 to Data8. The image data Data may be transmitted to the display driving unit 110 through the main processor 140, and the display driving unit 110 may output the image data Data (e.g., or converted image data RGB Data) to the foldable display panel 100 to display an image at (e.g., in or on) the first display area DA1 or the second display area DA2 of the foldable display panel 100.

Referring to FIG. 7B, in the full display mode (e.g., the second mode), the first to sixteenth antennas Ant1 to Ant16 may be activated, and the receiver 121 may receive first to sixteenth RF signals through the first to sixteenth antennas Ant1 to Ant16. The receiver 121 may generate first to sixteenth data Data1 to Data16 corresponding to the first to sixteenth RF signals, respectively, and may transmit the generated first to sixteenth data Data1 to Data16 to the decoder 122. The decoder 122 may generate image data Data by decoding the first to sixteenth data Data1 to Data16. The image data Data may be transmitted to the display driving unit 110 through the main processor 140, and the display driving unit 110 may output the image data Data (e.g., converted image data RGB Data) to the foldable display panel 100 to display an image at (e.g., in or on) the first display area DA1 and the second display area DA2 of the foldable display panel 100.

Figures 8A, 8B:
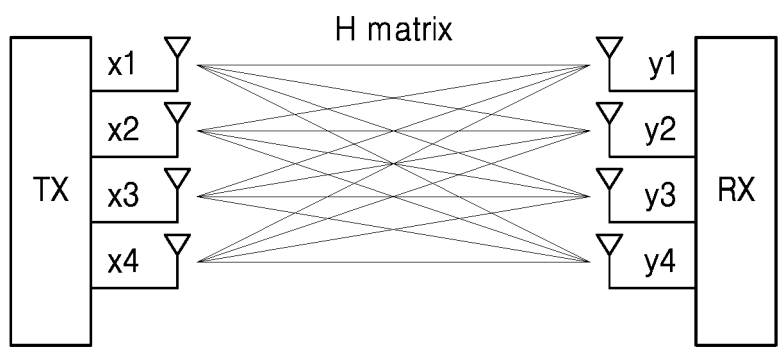
FIGS. 8A-8B are diagrams illustrating an operation in which a wireless signal is transmitted from a transmitting end to a receiving end by using $4 \times_4$ multiple-input and multiple-output (MIMO) technology.

FIGS. 8A and 8B are diagrams illustrating an operation in which a wireless signal is transmitted from the transmitting end TX to the receiving end RX by using 4×4 multiple-input and multiple-output (MIMO) technology.

Referring to FIG. 8A, the transmitting end TX includes four transmitting antennas x1 to x4, and the receiving end RX includes four receiving antennas y1 to y4. Each of the four transmitting antennas x1 to x4 transmits an RF signal to each of the four receiving antennas y1 to y4.

An operation in which RF signals transmitted from the four transmitting antennas x1 to x4 are received by the four receiving antennas y1 to y4 may be represented by an H matrix. The H matrix may be referred to as a channel information matrix H, and may represent a wireless communication channel between the four transmitting antennas x1 to x4 and the four receiving antennas y1 to y4.

Referring to FIG. 8B, an equation, in which an operation of each of the four transmitting antennas x1 to x4 for transmitting RF signals to each of the four receiving antennas y1 to y4 is represented by the H matrix, is shown.

Data transmitted from first to fourth transmitting antennas x1 to x4 of the transmitting end TX are respectively indicated as x1, x2, x3, and x4, and data received by first to fourth receiving antennas y1 to y4 of the receiving end RX are respectively indicated as y1, y2, y3, and y4. Noises received from the first to fourth receiving antennas y1 to y4 of the receiving end RX are respectively indicated as n1, n2, n3, and n4.

The H matrix is expressed as [$h_{11}$, $h_{12}$, $h_{13}$, $h_{14}$; $h_{21}$, $h_{22}$, $h_{23}$, $h_{24}$; $h_{31}$, $h_{32}$, $h_{33}$, $h_{34}$; $h_{41}$, $h_{42}$, $h_{43}$, $h_{44}$], and $h_{ab}$ refers to a channel through which an RF signal transmitted from an "a" transmitting antenna to a "b" receiving antenna passes.

Referring again to FIG. 6A, according to an embodiment of the present disclosure, in the half display mode (e.g., the first mode), eight receiving end patch antennas Ant1 to Ant8 of the receiving end RX may receive wireless communication data from 16 transmitting end patch antennas Ant1 to Ant16 of the transmitting end TX. In this case, the eight receiving end patch antennas Ant1 to Ant8 of the receiving end RX may correspond to (e.g., may be) the first patch antennas (e.g., AP1 of FIG. 3) or may correspond to (e.g., may be) the second patch antennas (e.g., AP2 of FIG. 3).

The wireless communication data may be transmitted from the 16 transmitting end patch antennas Ant1 to Ant16 of the transmitting end TX to the eight receiving end patch antennas Ant1 to Ant8 of the receiving end RX through a communication channel defined by the following channel information matrix H.

$$H = \begin{bmatrix} h_{1,1} & h_{1,2} & h_{1,3} & h_{1,4} & h_{1,5} & h_{1,6} & h_{1,7} & h_{1,8} & h_{1,9} & h_{1,10} & h_{1,11} & h_{1,12} & h_{1,13} & h_{1,14} & h_{1,15} & h_{1,16} \\ -h_{2,2} & h_{2,1} & h_{2,4} & -h_{2,3} & h_{2,6} & -h_{2,5} & -h_{2,8} & h_{2,7} & -h_{2,10} & h_{2,9} & h_{2,12} & -h_{2,11} & h_{2,14} & -h_{2,13} & -h_{2,16} & h_{2,15} \\ -h_{3,3} & -h_{3,4} & h_{3,1} & h_{3,2} & h_{3,7} & h_{3,8} & -h_{3,5} & -h_{3,6} & -h_{3,11} & -h_{3,12} & h_{3,9} & h_{3,10} & h_{3,15} & h_{3,16} & -h_{3,13} & -h_{3,14} \\ -h_{4,4} & h_{4,3} & -h_{4,2} & h_{4,1} & h_{4,8} & -h_{4,7} & h_{4,6} & -h_{4,5} & -h_{4,12} & h_{4,11} & -h_{4,10} & h_{4,9} & h_{4,16} & -h_{4,15} & h_{4,14} & -h_{4,13} \\ -h_{5,5} & -h_{5,6} & -h_{5,7} & -h_{5,8} & h_{5,1} & h_{5,2} & h_{5,3} & h_{5,4} & -h_{5,13} & -h_{5,14} & -h_{5,15} & -h_{5,16} & h_{5,9} & h_{5,10} & h_{5,11} & h_{5,12} \\ -h_{6,6} & h_{6,5} & -h_{6,8} & h_{6,7} & -h_{6,2} & h_{6,1} & -h_{6,4} & h_{6,3} & -h_{6,14} & h_{6,13} & -h_{6,16} & h_{6,15} & -h_{6,10} & h_{6,9} & -h_{6,12} & h_{6,11} \\ -h_{7,7} & h_{7,8} & h_{7,5} & -h_{7,6} & -h_{7,3} & h_{7,4} & h_{7,1} & -h_{7,2} & -h_{7,15} & h_{7,16} & h_{7,13} & -h_{7,14} & -h_{7,11} & h_{7,12} & h_{7,9} & -h_{7,10} \\ -h_{8,8} & -h_{8,7} & h_{8,6} & h_{8,5} & -h_{8,4} & -h_{8,3} & h_{8,2} & h_{8,1} & -h_{8,16} & -h_{8,15} & h_{8,14} & h_{8,13} & -h_{8,12} & -h_{8,11} & h_{8,10} & h_{8,9} \end{bmatrix}$$

According to one or more embodiments, the channel information matrix H has orthogonality. Because a communication channel having orthogonality is used according to one or more example embodiments of the present disclosure, MIMO communication performance may be improved.

The above-described channel information matrix H may be referred to as a 16×8 MIMO matrix. In other words, when the transmitting end TX (for example, a base station) is configured to enable 16×16 MIMO, the electronic device 1000 according to one or more example embodiments of the present disclosure may operate in the half display mode (e.g., the first mode) as the receiving end RX to activate the eight patch antennas Ant1 to Ant8 only, and may receive data only through the eight patch antennas Ant1 to Ant8. In this case, the above-described 16×8 MIMO matrix may be used.

According to another embodiment, when the transmitting end TX (for example, a base station) is configured to only enable 8×8 MIMO but disable 16×16 MIMO, the electronic device 1000 according to one or more example embodiments of the present disclosure operates in the half display mode (e.g., the first mode) as the receiving end RX to activate the eight patch antennas Ant1 to Ant8 only, and may receive data only through the eight patch antennas Ant1 to Ant8. In this case, an 8×8 MIMO may be used.

The RF driving unit 120 may estimate transmission data $x_1$ to $x_{16}$ by decoding reception data $y_1$ to $y_8$ received by the eight receiving end patch antennas Ant1 to Ant8 of the receiving end RX by using the following equation, and in some embodiments, the operation may be performed by the decoder (e.g., 122 of FIG. 7A).

$$\begin{bmatrix} \hat{x}_1 \\ x_2 \\ x_3 \\ x_4 \\ x_5 \\ x_6 \\ x_7 \\ x_8 \\ x_9 \\ x_{10} \\ x_{11} \\ x_{12} \\ x_{13} \\ x_{14} \\ x_{15} \\ x_{16} \end{bmatrix} = (H^H H)^{-1} H^H \begin{bmatrix} y_1 \\ y_2 \\ y_3 \\ y_4 \\ y_5 \\ y_6 \\ y_7 \\ y_8 \end{bmatrix}$$

The transmitting end TX may sequentially transmit the transmission data $x_1$ to $x_{16}$ through 16 transmitting end patch antennas Ant1 to Ant16 in a form of eight data rows arranged as $[x_1; x_2; x_3; x_4; x_5; x_6; x_7; x_8; x_9; x_{10}; x_{11}; x_{12}; x_{13}; x_{14}; x_{15}; x_{16}]$, $[-x_2; x_1; x_4; -x_3; x_6; -x_5; -x_8; x_7; -x_{10}; x_9; x_{12}; -x_{11}; x_{14}; -x_{13}; -x_{16}; x_{15}]$, $[-x_3; -x_4; x_1; x_2; x_7; x_8; -x_5; -x_6; -x_{11}; -x_{12}; x_9; x_{10}; x_{15}; x_{16}; -x_{13}; -x_{14}]$, $[-x_4; x_3; -x_2; x_1; x_8; -x_7; x_6; -x_5; -x_{12}; x_{11}; -x_{10}; x_9; x_{16}; -x_{15}; x_{14}; -x_{13}]$, $[-x_5; -x_6; -x_7; -x_8; x_1; x_2; x_3; x_4; -x_{13}; -x_{14}; -x_{15}; -x_{16}; x_9; x_{10}; x_{11}; x_{12}]$, $[-x_6; x_5; -x_8; x_7; -x_2; x_1; -x_4; x_3; -x_{14}; x_{13}; -x_{16}; x_{15}; -x_{10}; x_0; -x_{12}; x_{11}]$, $[-x_7; x_8; x_5; -x_6; -x_3; x_4; x_1; -x_2; -x_{15}; x_{16}; x_{13}; -x_{14}; -x_{11}; x_{12}; x_9; -x_{10}]$, and $[-x_8; -x_7; x_6; x_5; -x_4; -x_3; x_2; x_1; -x_{16}; -x_{15}; x_{14}; x_{13}; -x_{12}; -x_{11}; x_{10}; x_9]$.

For example, the transmitting end TX may respectively transmit the eight data rows arranged as described above during first to eighth time periods through the 16 transmitting end patch antennas Ant1 to Ant16. In other words, the transmitting end TX may transmit the data row $[x_1; x_2; x_3; x_4; x_5; x_6; x_7; x_8; x_9; x_{10}; x_{11}; x_{12}; x_{13}; x_{14}; x_{15}; x_{16}]$ through the 16 transmitting end patch antennas Ant1 to Ant16 during the first time period, may transmit the data row $[-x_2; x_1; x_4; -x_3; x_6; -x_5; -x_8; x_7; -x_{10}; x_9; x_{12}; -x_{11}; x_{14}; -x_{13}; -x_{16}; x_{15}]$ through the 16 transmitting end patch antennas Ant1 to Ant16 during the second time period, and the like. Accordingly, the transmitting end TX may transmit all eight data rows arranged as described above during the first to eighth time periods in such a method.

In the first time period, the data row $[x_1; x_2; x_3; x_4; x_5; x_6; x_7; x_8; x_9; x_{10}; x_{11}; x_{12}; x_{13}; x_{14}; x_{15}; x_{16}]$ may be transmitted concurrently (e.g., simultaneously) through the 16 transmitting end patch antennas Ant1 to Ant16, or may be transmitted at different timings.

Referring again to FIG. 6B, according to an embodiment of the present disclosure, in the full display mode (e.g., the second mode), the 16 receiving end patch antennas Ant1 to Ant16 of the receiving end RX may receive wireless data from the eight transmitting end patch antennas Ant1 to Ant8 of the transmitting end TX. In this case, the 16 receiving end patch antennas Ant1 to Ant16 of the receiving end RX may include the first patch antennas (e.g., AP1 of FIG. 3) and the second patch antennas (e.g., AP2 of FIG. 3).

The wireless communication data may be transmitted from the eight transmitting end patch antennas Ant1 to Ant8 of the transmitting end TX to the 16 receiving end patch antennas Ant1 to Ant16 of the receiving end RX through a communication channel defined by the following channel information matrix H.

$$H = \begin{bmatrix} h_{1,1} & h_{1,2} & h_{1,3} & h_{1,4} & h_{1,5} & h_{1,6} & h_{1,7} & h_{1,8} \\ -h_{2,2} & h_{2,1} & h_{2,4} & -h_{2,3} & h_{2,6} & -h_{2,5} & -h_{2,8} & h_{2,7} \\ -h_{3,3} & -h_{3,4} & h_{3,1} & h_{3,2} & h_{3,7} & h_{3,8} & -h_{3,5} & -h_{3,6} \\ -h_{4,4} & h_{4,3} & -h_{4,2} & h_{4,1} & h_{4,8} & -h_{4,7} & h_{4,6} & -h_{4,5} \\ -h_{5,5} & -h_{5,6} & -h_{5,7} & -h_{5,8} & h_{5,1} & h_{5,2} & h_{5,3} & h_{5,4} \\ -h_{6,6} & h_{6,5} & -h_{6,8} & h_{6,7} & -h_{6,2} & h_{6,1} & -h_{6,4} & h_{6,3} \\ -h_{7,7} & h_{7,8} & h_{7,5} & -h_{7,6} & -h_{7,3} & h_{7,4} & h_{7,1} & -h_{7,2} \\ -h_{8,8} & -h_{8,7} & h_{8,6} & h_{8,5} & -h_{8,4} & -h_{8,3} & h_{8,2} & h_{8,1} \\ h_{1,1}^* & h_{1,2}^* & h_{1,3}^* & h_{1,4}^* & h_{1,5}^* & h_{1,6}^* & h_{1,7}^* & h_{1,8}^* \\ -h_{2,2}^* & h_{2,1}^* & h_{2,3}^* & -h_{2,3}^* & h_{2,6}^* & -h_{2,5}^* & -h_{2,8}^* & h_{2,7}^* \\ -h_{3,3}^* & -h_{3,4}^* & h_{3,1}^* & h_{3,2}^* & h_{3,7}^* & h_{3,8}^* & -h_{3,5}^* & -h_{3,6}^* \\ -h_{4,4}^* & h_{4,3}^* & -h_{4,2}^* & h_{4,1}^* & h_{4,8}^* & -h_{4,7}^* & h_{4,6}^* & -h_{4,5}^* \\ -h_{5,5}^* & -h_{5,6}^* & -h_{5,7}^* & -h_{5,8}^* & h_{5,1}^* & h_{5,2}^* & h_{5,3}^* & h_{5,4}^* \\ -h_{6,6}^* & h_{6,5}^* & -h_{6,8}^* & h_{6,7}^* & -h_{6,2}^* & h_{6,1}^* & -h_{6,4}^* & h_{6,3}^* \\ -h_{7,7}^* & h_{7,8}^* & h_{7,5}^* & -h_{7,6}^* & -h_{7,3}^* & h_{7,4}^* & h_{7,1}^* & -h_{7,2}^* \\ -h_{8,8}^* & -h_{8,7}^* & h_{8,6}^* & h_{8,5}^* & -h_{8,4}^* & -h_{8,3}^* & h_{8,2}^* & h_{8,1}^* \end{bmatrix}$$

In this case, $h_{a,b}^*$ may be a conjugate value of $h_{a,b}$. According to one or more example embodiments of the present disclosure, the channel information matrix H has orthogonality. Because a communication channel having orthogonality is used according to one or more example embodiments of the present disclosure, MIMO communication performance may be improved.

The above-described channel information matrix H may be referred to as an 8×16 MIMO matrix. In other words, when the transmitting end TX (for example, a base station) is configured to enable 8×8 MIMO, the electronic device 1000 according to the present disclosure may operate in the full display mode (e.g., the second mode) as the receiving end RX to activate the 16 patch antennas Ant1 to Ant16, and may receive data through the 16 patch antennas Ant1 to Ant16. In this case, the above-described 8×16 MIMO matrix may be used.

According to another embodiment, when the transmitting end TX (for example, a base station) is configured to enable 16×16 MIMO, the electronic device 1000 of one or more example embodiments of the present disclosure may operate in the full display mode (e.g., the second mode) as the receiving end RX to receive data through the 16 patch antennas Ant1 to Ant16. In this case, the 16×16 MIMO matrix may be used.

The RF driving unit 120 may estimate transmission data $x_1$ to $x_8$ by decoding reception data $y_1$-$y_8$ and $y_1^*$-$y_8^*$ received by the 16 receiving end patch antennas Ant1 to Ant16 of the receiving end RX by using the following equation, and in some embodiments, the operation may be performed by the decoder (e.g., 122 of FIG. 7B).

$$\begin{bmatrix} \hat{x}_1 \\ x_2 \\ x_3 \\ x_4 \\ x_5 \\ x_6 \\ x_7 \\ x_8 \end{bmatrix} = (H^H H)^{-1} H^H \begin{bmatrix} y_1 \\ y_2 \\ y_3 \\ y_4 \\ y_5 \\ y_6 \\ y_7 \\ y_8 \\ y_1^* \\ y_2^* \\ y_3^* \\ y_4^* \\ y_5^* \\ y_6^* \\ y_7^* \\ y_8^* \end{bmatrix}$$

The transmitting end TX may sequentially transmit the transmission data $x_1$ to $x_8$ through the eight transmitting end patch antennas Ant1 to Ant8 in a form of 16 data rows arranged as $[x_1; x_2; x_3; x_4; x_5; x_6; x_7; x_8]$, $[-x_2; x_1; x_4; -x_3; x_6; -x_5; -x_8; x_7]$, $[-x_3; -x_4; x_1; x_2; x_7; x_8; -x_5; -x_6]$, $[-x_4; x_3; -x_2; x_1; x_8; -x_7; x_6; -x_5]$, $[-x_5; -x_6; -x_7; -x_8; x_1; x_2; x_3; x_4]$, $[-x_6; x_5; -x_8; x_7; -x_2; x_1; -x_4; x_3]$, $[-x_7; x_8; x_5; -x_6; -x_3; x_4; x_1; -x_2]$, $[-x_8; -x_7; x_6; x_5; -x_4; -x_3; x_2; x_1]$, $[x_1{}^*; x_2{}^*; x_3{}^*; x_4{}^*; x_5{}^*; x_6{}^*; x_7{}^*; x_8{}^*]$, $[-x_2{}^*; x_1{}^*; x_4{}^*; -x_3{}^*; x_6{}^*; -x_5{}^*; -x_8{}^*; x_7]$, $[-x_3{}^*, -x_4{}^*; x_1{}^*; x_2{}^*; x_7{}^*; x_8{}^*; -x_5{}^*; -x_6{}^*]$, $[-x_4{}^*; x_3{}^*; -x_2{}^*; x_1{}^*; x_8{}^*; -x_7{}^*; x_6{}^*; -x_5]$, $[-x_5{}^*; -x_6{}^*; -x_7{}^*; -x_8{}^*; x_1{}^*; x_2{}^*; x_3{}^*; x_4]$, $[-x_6{}^*; x_5{}^*; -x_8{}^*; x_7{}^*; -x_2{}^*; x_1{}^*; -x_4{}^*; x_3{}^*]$, $[-x_7{}^*; x_8{}^*; x_5{}^*; -x_6{}^*; -x_3{}^*; x_4{}^*; x_1{}^*; -x_2]$, and $[-x_8{}^*; -x_7{}^*; x_6{}^*; x_5{}^*; -x_4{}^*; -x_3{}^*; x_2{}^*; x_1{}^*]$.

For example, the transmitting end TX may respectively transmit the 16 data rows arranged as described above during first to sixteenth time periods through the eight transmitting end patch antennas Ant1 to Ant8. In other words, the transmitting end TX may transmit the data row $[x_1; x_2; x_3; x_4; x_5; x_6; x_7; x_8]$ through the eight transmitting end patch antennas Ant1 to Ant8 during the first time period, may transmit the data row $[-x_2; x_1; x_4; -x_3; x_6; -x_5; -x_8; x_7]$ through the eight transmitting end patch antennas Ant1 to Ant8 during the second time period, and the like. The transmitting end TX may transmit the data row $[-x_8{}^*; -x_7{}^*; x_6{}^*; x_5{}^*; -x_4{}^*; -x_3{}^*; x_2{}^*; x_1{}^*]$ through the eight transmitting end patch antennas Ant1 to Ant8 during the sixteenth time period. The transmitting end TX may transmit all 16 data rows arranged as described above during the first to sixteenth time periods in such a method.

Because the $16 \times 8$ channel information matrix may be used in the half display mode, and the $8 \times 16$ channel information matrix may be used in the full display mode, variation in power consumption may be reduced.

In other words, the electronic device 1000 according to one or more example embodiments of the present disclosure may be a foldable device, and may be folded and used in the half display mode (e.g., the first mode) and/or may be used in the full display mode (e.g., the second mode) when in an unfolded state. According to one or more example embodiments of the present disclosure, the number of embedded patch antennas that are activated may vary depending on an operation mode of the electronic device 1000, and optimization of power consumption and optimization of multiple access may be achieved according to a usage scenario by performing wireless communication by using a MIMO matrix selected based on the number of patch antennas activated.

According to various embodiments, when only a portion of a display panel is used, wireless communication may be performed by using patch antennas arranged at (e.g., in or on) the portion of the display panel to be used. In this case, because only the portion of the display panel is used, an amount of data required is small. Therefore, only a portion of the patch antennas may be used to stably perform wireless communication, and overall power consumption may be reduced.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. An electronic device, comprising:

a substrate comprising a first area and a second area;

a display panel on the substrate, and comprising a first display area at the first area and a second display area at the second area;

a plurality of first patch antennas at a first antenna area in the first area to receive data to be displayed as an image at the first display area;

a plurality of second patch antennas at a second antenna area in the second area to receive data to be displayed as an image at the second display area;

a display driving unit configured to drive the display panel;

a radio frequency (RF) driving unit configured to drive the plurality of first patch antennas and the plurality of second patch antennas; and a main processor configured to control the display driving unit and the RF driving unit to perform wireless data communication by using the plurality of first patch antennas or the plurality of second patch antennas in a first mode in which an image is displayed through one of the first display area or the second display area according to the data received by the plurality of first patch antennas or the plurality of second patch antennas, and to perform wireless data communication by using the plurality of first patch antennas and the plurality of second patch antennas in a second mode in which an image is displayed through both the first display area and the second display area according to the data received by the plurality of first patch antennas and the plurality of second patch antennas, wherein a number of the plurality of first patch antennas is eight, and a number of the plurality of second patch antennas is eight;

wherein, in the first mode, eight receiving end patch antennas are the plurality of first patch antennas or the plurality of second patch antennas, and the eight receiving end patch antennas are configured to be driven by the RF driving unit when the RF driving unit receives wireless communication data from a transmitting end having 16 transmitting end patch antennas; and wherein, in the first mode, the eight receiving end patch antennas are configured to receive the wireless communication data that is transmitted from the 16 transmitting end patch antennas through a communication channel defined by the following channel information matrix H:

$$H = \begin{bmatrix} h_{1,1} & h_{1,2} & h_{1,3} & h_{1,4} & h_{1,5} & h_{1,6} & h_{1,7} & h_{1,8} \\ -h_{2,2} & h_{2,1} & h_{2,4} & -h_{2,3} & h_{2,6} & -h_{2,5} & -h_{2,8} & h_{2,7} \\ -h_{3,3} & -h_{3,4} & h_{3,1} & h_{3,2} & h_{3,7} & h_{3,8} & -h_{3,5} & -h_{3,6} \\ -h_{4,4} & h_{4,3} & -h_{4,2} & h_{4,1} & h_{4,8} & -h_{4,7} & h_{4,6} & -h_{4,5} \\ -h_{5,5} & -h_{5,6} & -h_{5,7} & -h_{5,8} & h_{5,1} & h_{5,2} & h_{5,3} & h_{5,4} \\ -h_{6,6} & h_{6,5} & -h_{6,8} & h_{6,7} & -h_{6,2} & h_{6,1} & -h_{6,4} & h_{6,3} \\ -h_{7,7} & h_{7,8} & h_{7,5} & -h_{7,6} & -h_{7,3} & h_{7,4} & h_{7,1} & -h_{7,2} \\ -h_{8,8} & -h_{8,7} & h_{8,6} & h_{8,5} & -h_{8,4} & -h_{8,3} & h_{8,2} & h_{8,1} \end{bmatrix}$$

$$\begin{bmatrix} h_{1,9} & h_{1,10} & h_{1,11} & h_{1,12} & h_{1,13} & h_{1,14} & h_{1,15} & h_{1,16} \\ -h_{2,10} & h_{2,9} & h_{2,12} & -h_{2,11} & h_{2,14} & -h_{2,13} & -h_{2,16} & h_{2,15} \\ -h_{3,11} & -h_{3,12} & h_{3,9} & h_{3,10} & h_{3,15} & h_{3,16} & -h_{3,13} & -h_{3,14} \\ -h_{4,12} & h_{4,11} & -h_{4,10} & h_{4,9} & h_{4,16} & -h_{4,15} & h_{4,14} & -h_{4,13} \\ -h_{5,13} & -h_{5,14} & -h_{5,15} & -h_{5,16} & h_{5,9} & h_{5,10} & h_{5,11} & h_{5,12} \\ -h_{6,14} & h_{6,13} & -h_{6,16} & h_{6,15} & -h_{6,10} & h_{6,9} & -h_{6,12} & h_{6,11} \\ -h_{7,15} & h_{7,16} & h_{7,13} & -h_{7,14} & -h_{7,11} & h_{7,12} & h_{7,9} & -h_{7,10} \\ -h_{8,16} & -h_{8,15} & h_{8,14} & h_{8,13} & -h_{8,12} & -h_{8,11} & h_{8,10} & h_{8,9} \end{bmatrix}$$

2. The electronic device of claim 1, wherein the main processor is configured to control the display driving unit and the RF driving unit to perform the wireless data communication by using the plurality of first patch antennas when an image is displayed through the first display area, and to perform the wireless data communication by using the plurality of second patch antennas when an image is displayed through the second display area.

3. The electronic device of claim 1, wherein the first display area and the second display area are defined by a folding line, and
   the display panel is configured to be folded along the folding line.

4. The electronic device of claim 1, wherein the RF driving unit is configured to estimate transmission data $x_1$ to $x_{16}$ by decoding reception data $y_1$ to $y_8$ received by the eight receiving end patch antennas by using the following equation:

$$\begin{bmatrix} \hat{x}_1 \\ x_2 \\ x_3 \\ x_4 \\ x_5 \\ x_6 \\ x_7 \\ x_8 \\ x_9 \\ x_{10} \\ x_{11} \\ x_{12} \\ x_{13} \\ x_{14} \\ x_{15} \\ x_{16} \end{bmatrix} = (H^H H)^{-1} H^H \begin{bmatrix} y_1 \\ y_2 \\ y_3 \\ y_4 \\ y_5 \\ y_6 \\ y_7 \\ y_8 \end{bmatrix}.$$

5. The electronic device of claim 4, wherein the transmission data $x_1$ to $x_{16}$ is sequentially transmitted through the 16 transmitting end patch antennas in a form of eight data rows arranged as:

$[x_1; x_2; x_3; x_4; x_5; x_6; x_7; x_8; x_9; x_{10}; x_{11}; x_{12}; x_{13}; x_{14}; x_{15}; x_{16}]$, $[-x_2; x_1; x_4; -x_3; x_6; -x_5; -x_8; x_7; -x_{10}; x_9; x_{12}; -x_{11}; x_{14}; -x_{13}; -x_{16}; x_{15}]$, $[-x_3; -x_4; x_1; x_2; x_7; x_8; -x_5; -x_6; -x_{11}; -x_{12}; x_9; x_{10}; x_{15}; x_{16}; -x_{13}; -x_{14}]$, $[-x_4; x_3; -x_2; x_1; x_8; -x_7; x_6; -x_5; -x_{12}; x_{11}; -x_{10}; x_9; x_{16}; -x_{15}; x_{14}; -x_{13}]$, $[-x_5; -x_6; -x_7; -x_8; x_1; x_2; x_3; x_4; -x_{13}; -x_{14}; -x_{15}; -x_{16}; x_9; x_{10}; x_{11}; x_{12}]$, $[-x_6; x_5; -x_8; x_7; -x_2; x_1; -x_4; x_3; -x_{14}; x_{13}; -x_{16}; x_{15}; -x_{10}; x_9; -x_{12}; x_{11}]$, $[-x_7; x_8; x_5; -x_6; -x_3; x_4; x_1; -x_2; -x_{15}; x_{16}; x_{13}; -x_{14}; -x_{11}; x_{12}; x_9; -x_{10}]$, and $[-x_8; -x_7; x_6; x_5; -x_4; -x_3; x_2; x_1; -x_{16}; -x_{15}; x_{14}; x_{13}; -x_{12}; -x_{11}; x_{10}; x_9]$.

6. An electronic device, comprising:

a substrate comprising a first area and a second area;

a display panel on the substrate, and comprising a first display area at the first area and a second display area at the second area;

a plurality of first patch antennas at a first antenna area in the first area to receive data to be displayed as an image at the first display area;

a plurality of second patch antennas at a second antenna area in the second area to receive data to be displayed as an image at the second display area;

a display driving unit configured to drive the display panel;

a radio frequency (RF) driving unit configured to drive the plurality of first patch antennas and the plurality of second patch antennas; and a main processor configured to control the display driving unit and the RF driving unit to perform wireless data communication by using the plurality of first patch antennas or the plurality of second patch antennas in a first mode in which an image is displayed through one of the first display area or the second display area according to the data received by the plurality of first patch antennas or the plurality of second patch antennas, and to perform wireless data communication by using the plurality of first patch antennas and the plurality of second patch antennas in a second mode in which an image is displayed through both the first display area and the second display area according to the data received by the plurality of first patch antennas and the plurality of second patch antennas, wherein a number of the plurality of first patch antennas is eight, and a number of the plurality of second patch antennas is eight;

wherein, in the second mode, 16 receiving end patch antennas are the plurality of first patch antennas and the plurality of second patch antennas, and the 16 receiving end patch antennas driven by the RF driving unit are configured to receive wireless communication data from a transmitting end having eight transmitting end patch antennas; and wherein, in the second mode, the 16 receiving end patch antennas are configured to receive the wireless communication data that is transmitted from the eight transmitting end patch antennas through a communication channel defined by the following channel information matrix H:

$$H = \begin{bmatrix} h_{1,1} & h_{1,2} & h_{1,3} & h_{1,4} & h_{1,5} & h_{1,6} & h_{1,7} & h_{1,8} \\ -h_{2,2} & h_{2,1} & h_{2,4} & -h_{2,3} & h_{2,6} & -h_{2,5} & -h_{2,8} & h_{2,7} \\ -h_{3,3} & -h_{3,4} & h_{3,1} & h_{3,2} & h_{3,7} & h_{3,8} & -h_{3,5} & -h_{3,6} \\ -h_{4,4} & h_{4,3} & -h_{4,2} & h_{4,1} & h_{4,8} & -h_{4,7} & h_{4,6} & -h_{4,5} \\ -h_{5,5} & -h_{5,6} & -h_{5,7} & -h_{5,8} & h_{5,1} & h_{5,2} & h_{5,3} & h_{5,4} \\ -h_{6,6} & h_{6,5} & -h_{6,8} & h_{6,7} & -h_{6,2} & h_{6,1} & -h_{6,4} & h_{6,3} \\ -h_{7,7} & h_{7,8} & h_{7,5} & -h_{7,6} & -h_{7,3} & h_{7,4} & h_{7,1} & -h_{7,2} \\ -h_{8,8} & -h_{8,7} & h_{8,6} & h_{8,5} & -h_{8,4} & -h_{8,3} & h_{8,2} & h_{8,1} \\ h^*_{1,1} & h^*_{1,2} & h^*_{1,3} & h^*_{1,4} & h^*_{1,5} & h^*_{1,6} & h^*_{1,7} & h^*_{1,8} \\ -h^*_{2,2} & h^*_{2,1} & h^*_{2,3} & -h^*_{2,3} & h^*_{2,6} & -h^*_{2,5} & -h^*_{2,8} & h^*_{2,7} \\ -h^*_{3,3} & -h^*_{3,4} & h^*_{3,1} & h^*_{3,2} & h^*_{3,7} & h^*_{3,8} & -h^*_{3,5} & -h^*_{3,6} \\ -h^*_{4,4} & h^*_{4,3} & -h^*_{4,2} & h^*_{4,1} & h^*_{4,8} & -h^*_{4,7} & h^*_{4,6} & -h^*_{4,5} \\ -h^*_{5,5} & -h^*_{5,6} & -h^*_{5,7} & -h^*_{5,8} & h^*_{5,1} & h^*_{5,2} & h^*_{5,3} & h^*_{5,4} \\ -h^*_{6,6} & h^*_{6,5} & -h^*_{6,8} & h^*_{6,7} & -h^*_{6,2} & h^*_{6,1} & -h^*_{6,4} & h^*_{6,3} \\ -h^*_{7,7} & h^*_{7,8} & h^*_{7,5} & -h^*_{7,6} & -h^*_{7,3} & h^*_{7,4} & h^*_{7,1} & -h^*_{7,2} \\ -h^*_{8,8} & -h^*_{8,7} & h^*_{8,6} & h^*_{8,5} & -h^*_{8,4} & -h^*_{8,3} & h^*_{8,2} & h^*_{8,1} \end{bmatrix}$$

7. The electronic device of claim 6, wherein the RF driving unit is configured to estimate transmission data $x_1$ to $x_8$ by decoding reception data $y_1$ to $y_8$ and $y_1^*$ to $y_8^*$ received by the 16 receiving end patch antennas by using the following equation:

$$\begin{bmatrix} \hat{x}_1 \\ x_2 \\ x_3 \\ x_4 \\ x_5 \\ x_6 \\ x_7 \\ x_8 \end{bmatrix} = (H^H H)^{-1} H^H \begin{bmatrix} y_1 \\ y_2 \\ y_3 \\ y_4 \\ y_5 \\ y_6 \\ y_7 \\ y_8 \\ y_1^* \\ y_2^* \\ y_3^* \\ y_4^* \\ y_5^* \\ y_6^* \\ y_7^* \\ y_8^* \end{bmatrix}.$$

8. The electronic device of claim 7, wherein the transmission data $x_1$ to $x_8$ is sequentially transmitted through the eight transmitting end patch antennas in a form of 16 data rows arranged as:

$[x_1; x_2; x_3; x_4; x_5; x_6; x_7; x_8]$,
$[-x_2; x_1; x_4; -x_3; x_6; -x_5; -x_8; x_7]$,
$[-x_3; -x_4; x_1; x_2; x_7; x_8; -x_5; -x_6]$,
$[-x_4; x_3; -x_2; x_1; x_8; -x_7; x_6; -x_5]$,
$[-x_5; -x_6; -x_7; -x_8; x_1; x_2; x_3; x_4]$,
$[-x_6; x_5; -x_8; x_7; -x_2; x_1; -x_4; x_3]$,
$[-x_7; x_8; x_5; -x_6; -x_3; x_4; x_1; -x_2]$,
$[-x_8; -x_7; x_6; x_5; -x_4; -x_3; x_2; x_1]$,
$[x_1^*; x_1; x_3^*; x_4^*; x_5^*; x_6^*; x_7^*, x_8^*]$,
$[-x_2^*; x_1^*; x_4^*; -x_3^*; x_6^*; -x_5^*; -x_8^*, x_7^*]$,
$[-x_3^*; -x_4^*; x_1^*; x_2^*; x_7^*; x_8^*; -x_5^*; -x_6^*]$,
$[-x_4^*; x_3^*; x_1^*; x_8^*; -x_7^*; x_6^*; -x_5^*]$,
$[-x_5^*; -x_6^*; -x_7^*; -x_8^*; x_1^*; x_2^*; x_3^*; x_4^*]$,
$[-x_6^*; x_5^*; -x_8^*; x_7^*; -x_2^*; x_1^*; -x_4^*; x_3^*]$,
$[-x_7^*; x_8^*; x_5^*; -x_6^*; -x_3^*; x_4^*; x_1^*; -x_2^*]$, and
$[-x_8^*; -x_7^*; x_6^*; x_5^*; -x_4^*; -x_3^*; x_2^*; x_1^*]$.

9. A communication method between an electronic device and a transmitting device, the electronic device comprising: a substrate comprising a first area and a second area; a display panel comprising a first display area at the first area and a second display area at the second area; a plurality of first patch antennas at the first area to receive data to be displayed as an image at the first display area; and a plurality of second patch antennas at the second area to receive data to be displayed as an image at the second display area, the method comprising:

performing, by the electronic device, wireless data communication by using the plurality of first patch antennas or the plurality of second patch antennas in a first mode in which an image is displayed through one of the first display area or the second display area according to the data received by the plurality of first patch antennas or the plurality of second patch antennas;

performing, by the electronic device, wireless data communication by using the plurality of first patch antennas and the plurality of second patch antennas in a second mode in which an image is displayed through both the first display area and the second display area according to the data received by the plurality of first patch antennas and the plurality of second patch antennas;

transmitting, by the transmitting device, wireless communication data by using 16 transmitting end patch antennas in the first mode; and receiving, by the electronic device, the wireless communication data by using eight receiving end patch antennas, which are the plurality of first patch antennas or the plurality of second patch antennas in the first mode, wherein, in the first mode, the wireless communication data is transmitted from the 16 transmitting end patch antennas to the eight receiving end patch antennas through a communication channel defined by the following channel information matrix H:

$$H = \begin{bmatrix} h_{1,1} & h_{1,2} & h_{1,3} & h_{1,4} & h_{1,5} & h_{1,6} & h_{1,7} & h_{1,8} & h_{1,9} & h_{1,10} & h_{1,11} & h_{1,12} & h_{1,13} & h_{1,14} & h_{1,15} & h_{1,16} \\ -h_{2,2} & h_{2,1} & h_{2,4} & -h_{2,3} & h_{2,6} & -h_{2,5} & -h_{2,8} & h_{2,7} & -h_{2,10} & h_{2,9} & h_{2,12} & -h_{2,11} & h_{2,14} & -h_{2,13} & -h_{2,16} & h_{2,15} \\ -h_{3,3} & -h_{3,4} & h_{3,1} & h_{3,2} & h_{3,7} & h_{3,8} & -h_{3,5} & -h_{3,6} & -h_{3,11} & -h_{3,12} & h_{3,9} & h_{3,10} & h_{3,15} & h_{3,16} & -h_{3,13} & -h_{3,14} \\ -h_{4,4} & h_{4,3} & -h_{4,2} & h_{4,1} & h_{4,8} & -h_{4,7} & h_{4,6} & -h_{4,5} & -h_{4,12} & h_{4,11} & -h_{4,10} & h_{4,9} & h_{4,16} & -h_{4,15} & h_{4,14} & -h_{4,13} \\ -h_{5,5} & -h_{5,6} & -h_{5,7} & -h_{5,8} & h_{5,1} & h_{5,2} & h_{5,3} & h_{5,4} & -h_{5,13} & -h_{5,14} & -h_{5,15} & -h_{5,16} & h_{5,9} & h_{5,10} & h_{5,11} & h_{5,12} \\ -h_{6,6} & h_{6,5} & -h_{6,8} & h_{6,7} & -h_{6,2} & h_{6,1} & -h_{6,4} & h_{6,3} & -h_{6,14} & h_{6,13} & -h_{6,16} & h_{6,15} & -h_{6,10} & h_{6,9} & -h_{6,12} & h_{6,11} \\ -h_{7,7} & h_{7,8} & h_{7,5} & -h_{7,6} & -h_{7,3} & h_{7,4} & h_{7,1} & -h_{7,2} & -h_{7,15} & h_{7,16} & h_{7,13} & -h_{7,14} & -h_{7,11} & h_{7,12} & h_{7,9} & -h_{7,10} \\ -h_{8,8} & -h_{8,7} & h_{8,6} & h_{8,5} & -h_{8,4} & -h_{8,3} & h_{8,2} & h_{8,1} & -h_{8,16} & -h_{8,15} & h_{8,14} & h_{8,13} & -h_{8,12} & -h_{8,11} & h_{8,10} & h_{8,9} \end{bmatrix}.$$

10. The method of claim 9, further comprising:

performing, by the electronic device, wireless data communication by using the plurality of first patch antennas in a 1-1 mode in which an image is displayed through the first display area; and performing, by the electronic device, wireless data communication by using the plurality of second patch antennas in a 1-2 mode in which an image is displayed through the second display area.

11. The method of claim 9, further comprising estimating, by the electronic device, transmission data $x_1$ to $x_{16}$ by decoding reception data $y_1$ to $y_8$ received by the eight receiving end patch antennas by using the following equation:

$$\begin{bmatrix} \hat{x}_1 \\ x_2 \\ x_3 \\ x_4 \\ x_5 \\ x_6 \\ x_7 \\ x_8 \\ x_9 \\ x_{10} \\ x_{11} \\ x_{12} \\ x_{13} \\ x_{14} \\ x_{15} \\ x_{16} \end{bmatrix} = (H^H H)^{-1} H^H \begin{bmatrix} y_1 \\ y_2 \\ y_3 \\ y_4 \\ y_5 \\ y_6 \\ y_7 \\ y_8 \end{bmatrix}.$$

12. The method of claim 9, further comprising:

transmitting, by the transmitting device, wireless communication data by using eight transmitting end patch antennas in the second mode; and receiving, by the electronic device, the wireless communication data by using 16 receiving end patch antennas, which are the plurality of first patch antennas and the plurality of second patch antennas in the second mode.

13. The method of claim 12, wherein, in the second mode, the wireless communication data is transmitted from the eight transmitting end patch antennas to the 16 receiving end patch antennas through a communication channel defined by the following channel information matrix H:

$$H = \begin{bmatrix} h_{1,1} & h_{1,2} & h_{1,3} & h_{1,4} & h_{1,5} & h_{1,6} & h_{1,7} & h_{1,8} \\ -h_{2,2} & h_{2,1} & h_{2,4} & -h_{2,3} & h_{2,6} & -h_{2,5} & -h_{2,8} & h_{2,7} \\ -h_{3,3} & -h_{3,4} & h_{3,1} & h_{3,2} & h_{3,7} & h_{3,8} & -h_{3,5} & -h_{3,6} \\ -h_{4,4} & h_{4,3} & -h_{4,2} & h_{4,1} & h_{4,8} & -h_{4,7} & h_{4,6} & -h_{4,5} \\ -h_{5,5} & -h_{5,6} & -h_{5,7} & -h_{5,8} & h_{5,1} & h_{5,2} & h_{5,3} & h_{5,4} \\ -h_{6,6} & h_{6,5} & -h_{6,8} & h_{6,7} & -h_{6,2} & h_{6,1} & -h_{6,4} & h_{6,3} \\ -h_{7,7} & h_{7,8} & h_{7,5} & -h_{7,6} & -h_{7,3} & h_{7,4} & h_{7,1} & -h_{7,2} \\ -h_{8,8} & -h_{8,7} & h_{8,6} & h_{8,5} & -h_{8,4} & -h_{8,3} & h_{8,2} & h_{8,1} \\ h^*_{1,1} & h^*_{1,2} & h^*_{1,3} & h^*_{1,4} & h^*_{1,5} & h^*_{1,6} & h^*_{1,7} & h^*_{1,8} \\ -h^*_{2,2} & h^*_{2,1} & h^*_{2,3} & -h^*_{2,3} & h^*_{2,6} & -h^*_{2,5} & -h^*_{2,8} & h^*_{2,7} \\ -h^*_{3,3} & -h^*_{3,4} & h^*_{3,1} & h^*_{3,2} & h^*_{3,7} & h^*_{3,8} & -h^*_{3,5} & -h^*_{3,6} \\ -h^*_{4,4} & h^*_{4,3} & -h^*_{4,2} & h^*_{4,1} & h^*_{4,8} & -h^*_{4,7} & h^*_{4,6} & -h^*_{4,5} \\ -h^*_{5,5} & -h^*_{5,6} & -h^*_{5,7} & -h^*_{5,8} & h^*_{5,1} & h^*_{5,2} & h^*_{5,3} & h^*_{5,4} \\ -h^*_{6,6} & h^*_{6,5} & -h^*_{6,8} & h^*_{6,7} & -h^*_{6,2} & h^*_{6,1} & -h^*_{6,4} & h^*_{6,3} \\ -h^*_{7,7} & h^*_{7,8} & h^*_{7,5} & -h^*_{7,6} & -h^*_{7,3} & h^*_{7,4} & h^*_{7,1} & -h^*_{7,2} \\ -h^*_{8,8} & -h^*_{8,7} & h^*_{8,6} & h^*_{8,5} & -h^*_{8,4} & -h^*_{8,3} & h^*_{8,2} & h^*_{8,1} \end{bmatrix}.$$

14. The method of claim 13, further comprising estimating, by the electronic device, transmission data $x_1$ to $x_8$ by decoding reception data $y_1$ to $y_8$ and $y_1^*$ to $y_8^*$ received by the 16 receiving end patch antennas by using the following equation:

$$\begin{bmatrix} \hat{x}_1 \\ x_2 \\ x_3 \\ x_4 \\ x_5 \\ x_6 \\ x_7 \\ x_8 \end{bmatrix} = (H^H H)^{-1} H^H \begin{bmatrix} y_1 \\ y_2 \\ y_3 \\ y_4 \\ y_5 \\ y_6 \\ y_7 \\ y_8 \\ y_1^* \\ y_2^* \\ y_3^* \\ y_4^* \\ y_5^* \\ y_6^* \\ y_7^* \\ y_8^* \end{bmatrix}.$$

\* \* \* \* \*